US008780175B2

(12) United States Patent
Miyazaki et al.

(10) Patent No.: US 8,780,175 B2
(45) Date of Patent: Jul. 15, 2014

(54) PICTURE SIGNAL PROCESSOR, PICTURE DISPLAY AND PICTURE DISPLAY SYSTEM

(75) Inventors: Shinichiro Miyazaki, Kanagawa (JP); Kyoichiro Oda, Tokyo (JP); Minoru Urushihara, Tokyo (JP); Makoto Kondo, Kanagawa (JP); Yoichi Matsumura, Kanagawa (JP); Hideki Watanabe, Saitama (JP)

(73) Assignee: Sony Corporation, Tokyo (JP)

( * ) Notice: Subject to any disclaimer, the term of this patent is extended or adjusted under 35 U.S.C. 154(b) by 361 days.

(21) Appl. No.: 13/081,969

(22) Filed: Apr. 7, 2011

(65) Prior Publication Data

US 2011/0285816 A1   Nov. 24, 2011

(30) Foreign Application Priority Data

May 18, 2010   (JP) ................................. 2010-114653

(51) Int. Cl.
*H04N 13/00* (2006.01)
*H04N 7/01* (2006.01)
*H04N 13/04* (2006.01)

(52) U.S. Cl.
CPC .............. *H04N 7/014* (2013.01); *H04N 7/0132* (2013.01); *H04N 13/0497* (2013.01); *H04N 13/0438* (2013.01)
USPC  348/43; 348/E13.068; 348/513; 348/E9.034; 345/213

(58) Field of Classification Search
CPC .......... H04N 13/0438; H04N 13/0497; H04N 7/0132; H04N 7/014; G02B 27/2264
USPC ........ 345/213; 348/43, 513, E9.034, E13.068
See application file for complete search history.

(56) References Cited

U.S. PATENT DOCUMENTS

| 2007/0035706 | A1* | 2/2007 | Margulis .................... 353/122 |
| 2009/0219382 | A1* | 9/2009 | Routhier et al. ............... 348/43 |
| 2010/0046615 | A1* | 2/2010 | Chen et al. ............... 375/240.03 |
| 2010/0053429 | A1* | 3/2010 | Miyazaki et al. ............. 348/513 |

FOREIGN PATENT DOCUMENTS

| JP | 10-240212 A | 9/1998 |
| JP | 2000-4451 | 1/2000 |
| JP | 2010-158013 A | 7/2010 |
| JP | 2011-139222 A | 7/2011 |

OTHER PUBLICATIONS

Office Action issued Nov. 19, 2013, in Japanese Patent Application No. 2010-114653.

* cited by examiner

*Primary Examiner* — Sath V Perungavoor
*Assistant Examiner* — Dakshesh Parikh
(74) *Attorney, Agent, or Firm* — Oblon, Spivak, McClelland, Maier & Neustadt, L.L.P.

(57) ABSTRACT

A picture signal processor includes: a frame-rate conversion section performing a frame-rate-increasing conversion, which brings an over-double frame rate, on each of a plurality of time-series picture streams each including a plurality of unit pictures, and providing frame-rate-converted picture streams to a display section which displays pictures through performing time-divisional switching of picture streams from one to another in order; and a shutter control section controlling a shutter eyeglass device to perform an open/close operation in synchronization with a display switching timing between the frame-rate-converted picture streams in the display section.

13 Claims, 19 Drawing Sheets

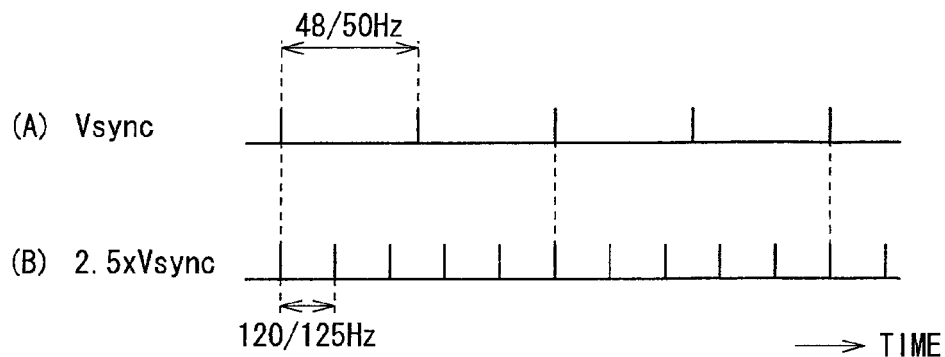
FIG. 4
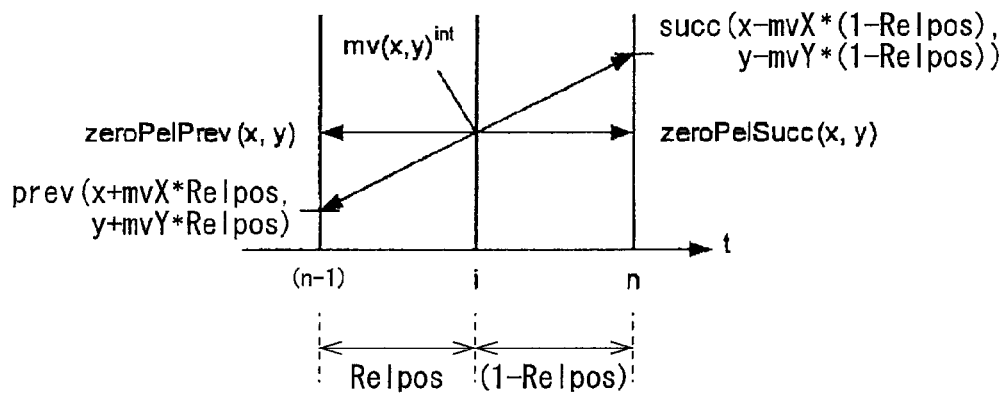
FIG. 5
| | L0, R0 | L0.4, R0.4 | L0.8, R0.8 | L1.2, R1.2 | L1.6, R1.6 | L2, R2 |
|---|---|---|---|---|---|---|
| INTERPOLATION COEFFICIENT (Relpos) | 0 | 0.4 | 0.8 | 0.2 | 0.6 | 0 |
FIG. 6

FIG. 21

PICTURE SIGNAL PROCESSOR, PICTURE DISPLAY AND PICTURE DISPLAY SYSTEM

BACKGROUND

The present disclosure relates to a picture display system using a shutter eyeglass device, and a picture signal processor and a picture display suitably used in such a system.

In recent years, as displays for flat-screen televisions and portable terminals, active matrix liquid crystal displays (LCDs) in which TFTs (Thin Film Transistors) are arranged for respective pixels are often used. In such liquid crystal displays, typically, pixels are individually driven by line-sequentially writing a picture signal to auxiliary capacitance elements and liquid crystal elements of the pixels from the top to the bottom of a screen.

In the liquid crystal displays, depending on applications, a drive (hereinafter referred to as time-division drive) for dividing one frame period into a plurality of periods and displaying different pictures in the respective periods is performed. Examples of a liquid crystal display using such a time-division drive system include a liquid crystal display using a field sequential system and a stereoscopic picture display system using a shutter eyeglass device as described in Japanese Patent Application Unexamined Publication No. 2000-4451.

In the stereoscopic picture display system using the shutter eyeglass device, one frame period is divided into two periods, and two picture streams which have a parallax therebetween as a right-eye picture stream and a left-eye picture stream are alternately displayed. Moreover, a shutter eyeglass device performing an open/close operation in synchronization with switching of the picture streams from one to another is used. The shutter eyeglass device is controlled so that a left-eye lens is opened (a right-eye lens is closed) in a left-eye picture displaying period and the right-eye lens is opened (the left-eye lens is closed) in a right-eye picture displaying period. When a viewer wearing such a shutter eyeglass device watches displayed pictures, stereoscopic vision is achieved.

SUMMARY

In such a stereoscopic picture display system, as described above, open/close operations of a right-eye lens and a left-eye lens in a shutter eyeglass device are separately performed in synchronization with a display switching timing between a right-eye picture stream and a left-eye picture stream; therefore, in principle, the period of the open/close operation of each lens is long. In other words, the frequency of the open/close operation of each lens in the shutter eyeglass device is equal to ½ of the frequency of each picture displaying period (a sub-frame period). Therefore, when pictures are viewed with use of the shutter eyeglass device, the occurrence of flicker (plane flicker) is easily perceived due to characteristics of human eyes.

In a picture display technique by a time-division drive system in related art, when pictures are viewed with use of the shutter eyeglass device, flickers are easily generated; therefore, it is desirable to achieve a technique for overcoming such an issue. The above-described issue may occur not only in liquid crystal displays but also displays of any other kinds.

It is desirable to provide a picture signal processor, a picture display and a picture display system which are allowed to reduce the occurrence of flicker when pictures are viewed with use of a shutter eyeglass device.

According to an embodiment of the disclosure, there is provided A picture signal processor including: a frame-rate conversion section performing a frame-rate-increasing conversion, which brings an over-double frame rate, on each of a plurality of time-series picture streams each including a plurality of unit pictures, and providing frame-rate-converted picture streams to a display section which displays pictures through performing time-divisional switching of picture streams from one to another in order; and a shutter control section controlling a shutter eyeglass device to perform an open/close operation in synchronization with a display switching timing between the frame-rate-converted picture streams in the display section. In this case, "picture stream" means a time sequence of unit pictures, and examples of the picture stream includes a left-eye picture stream and a right-eye picture stream in the case where stereoscopic picture display is performed. Moreover, in the case of a picture stream with a frequency of 50 Hz, still pictures are sequentially switched from one to another at 50 Hz, and each of the still pictures corresponds to the above-described "unit picture".

According to an embodiment of the disclosure, there is provided a picture display including: a frame-rate conversion section performing a frame-rate-increasing conversion, which brings an over-double frame rate, on each of a plurality of time-series picture streams each including a plurality of unit pictures, a display section displaying pictures with use of unit pictures in frame-rate-converted picture streams through performing time-divisional switching of picture streams from one to another in order; and a shutter control section controlling a shutter eyeglass device to perform an open/close operation in synchronization with a display switching timing between the frame-rate converted picture streams in the display section.

According to an embodiment of the disclosure, there is provided a picture display system including: the picture display according to the above-described embodiment of the disclosure displaying pictures through performing time-divisional switching of a plurality of time-series picture streams from one to another in order, the plurality of time-series picture streams each including a plurality of unit pictures; and a shutter eyeglass device performing an open/close operation in synchronization with a display switching timing between picture streams in the picture display, In the picture signal processor, the picture display and the picture display system according to the embodiment of the disclosure, the frame-rate-increasing conversion which brings an over-double frame rate is performed on each of the plurality of time-series picture streams. Then, frame-rate-converted picture streams are provided to the display section displaying pictures through performing time-divisional switching of picture streams from one to another in order. Moreover, the shutter eyeglass device is controlled to perform an open/close operation in synchronization with a display switching timing between the frame-rate-converted picture streams. Thus, when pictures are displayed with use of the frame-rate-converted picture streams and the open/close operation of the shutter eyeglass device is performed in synchronization with a display switching timing between the frame-rate-converted picture streams, the period of the open/close operation of the shutter eyeglass device is shortened (the frequency of the open/close operation is increased), compared to related art.

In the picture signal processor, the picture display and the picture display system according to the embodiment of the disclosure, the frame-rate-increasing conversion which brings an over-double frame rate is performed on each of the plurality of time-series picture streams, and the frame-rate-converted picture streams are provided to the display section displaying pictures through performing time-divisional switching of picture steams from one to another in order, and the shutter eyeglass device is controlled to perform an open/close operation in synchronization with a display switching timing between the frame-rate-converted picture streams; therefore, compared to related art, the period of the open/close operation of the shutter eyeglass device is allowed to be shortened (the frequency of the open/close operation is allowed to be increased). Therefore, the occurrence of flicker when pictures are viewed with use of the shutter eyeglass device is allowed to be reduced.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 4 is a timing chart for describing an operation of a timing controller illustrated in FIG. 3.

FIG. 5 is a timing chart for describing an operation of an interpolation section illustrated in FIG. 3.

FIG. 6 is a diagram illustrating an example of an interpolation parameter illustrated in FIG. 5.

FIG. 21 is a timing chart illustrating a stereoscopic picture display operation according to another modification.

DETAILED DESCRIPTION OF THE PREFERRED EMBODIMENTS

A preferred embodiment of the disclosure will be described in detail below referring to the accompanying drawings. Descriptions will be given in the following order.
1. Embodiment (Example 1 in which 2.5-times speed conversion is performed on a picture signal: interpolation positions are arranged at equal intervals)
2. Modification 1 (Example 2 in which 2.5-times speed conversion is performed on a picture signal: interpolation positions are arranged at unequal intervals)
3. Modification 2 (Example in which 4-times speed conversion is performed on a picture signal: interpolation positions are arranged at equal intervals or unequal intervals)
4. Modification 3 (Example in which 5-times speed conversion is performed on a picture signal with use of 2-consecutive-times writing system)
5. Modification 4 (Example in which the disclosure is applied to a multiple picture display system)
6. Other modifications (Example in which a frame-rate-increasing conversion by overwriting is used, and the like)

Embodiment

Whole Configuration of Picture Display System

Figure 1:
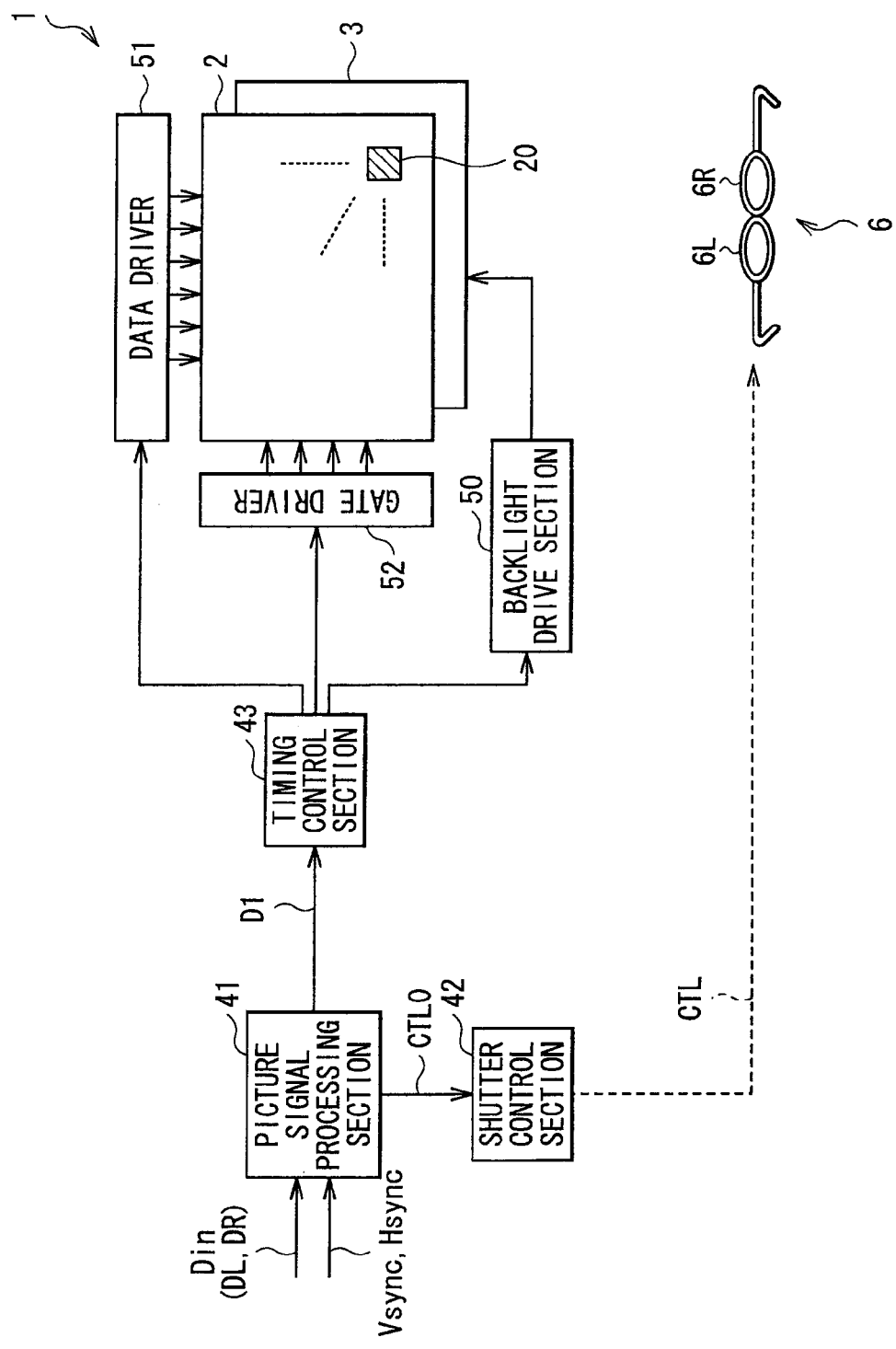
FIG. 1 is a block diagram illustrating a whole configuration of a picture display system according to an embodiment of the disclosure.

FIG. 1 illustrates a block diagram of a picture display system according to an embodiment of the disclosure. The picture display system is a time-division drive stereoscopic picture display system, and includes a picture display (liquid crystal display 1) and a shutter eyeglass device 6 according to an embodiment of the disclosure.

Configuration of Liquid Crystal Display 1

The liquid crystal display 1 displays pictures based on an input picture signal Din including a right-eye picture signal DR (each right-eye picture signal belonging to a right-eye picture stream) and a left-eye picture signal DL (each left-eye picture signal belonging to a left-eye picture stream) which have a binocular parallax. The liquid crystal display 1 includes a liquid crystal display panel 2, a backlight 3, a picture signal processing section 41, a shutter control section 42, a timing control section 43, a backlight drive section 50, a data driver 51 and a gate driver 52. The picture signal processing section 41 and the shutter control section 42 correspond to a specific example of "a display signal processor" in the disclosure, and the picture signal processing section 41 corresponds to a specific example of "high frame-rate conversion section" in the disclosure.

The backlight 3 is a light source applying light to the liquid crystal display panel 2, and is configured of, for example, an LED (Light Emitting Diode) or a CCFL (Cold Cathode Fluorescent Lamp).

The liquid crystal display panel 2 modulates light emitted from the backlight 3 based on a picture voltage supplied from the data driver 51 in response to a drive signal supplied from the gate driver 52 which will be described later so as to display pictures based on the input picture signal Din. Specifically, as will be described in detail later, right-eye pictures (right-eye unit pictures belonging to the right-eye picture stream) based on the right-eye picture signal DR and left-eye pictures (left-eye unit pictures belonging to the left-eye picture stream) based on the left-eye picture signal DL are alternately displayed in a time-divisional manner. More specifically, the liquid crystal display panel 2 displays pictures with use of the right-eye picture stream and the left-eye picture stream of which the frame rates are converted in the picture signal processing section 41 which will be described later through performing time-divisional switching of the right-eye picture stream and the left-eye picture stream from one to another in order. Therefore, in the liquid crystal display panel 2, a time division drive for stereoscopic picture display is performed. The liquid crystal display panel 2 includes a plurality of pixels 20 arranged in a matrix form as a whole.

Figure 2:
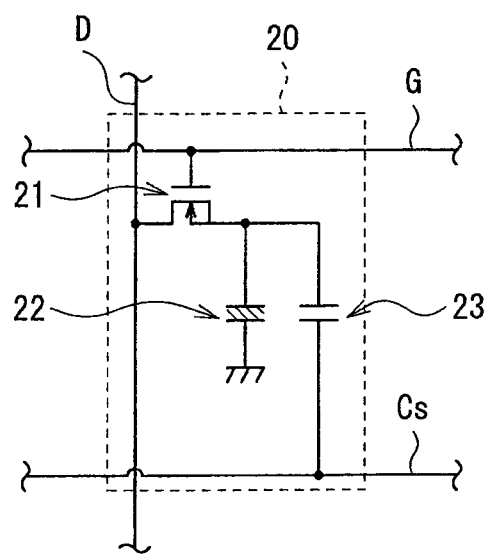
FIG. 2 is a circuit diagram illustrating a specific configuration example of a pixel illustrated in FIG. 1.

FIG. 2 illustrates a circuit configuration example of a pixel circuit in each pixel 20. The pixel 20 includes a liquid crystal element 22, a TFT element 21 and an auxiliary capacitance element 23. A gate line G for line-sequentially selecting a pixel to be driven, a data line D for supplying a picture voltage (a picture voltage supplied from the data driver 51) to the pixel to be driven and an auxiliary capacitance line Cs are connected to the pixel 20.

The liquid crystal element 22 performs a display operation in response to a picture voltage supplied from the data line D to one end thereof through the TFT element 21. The liquid crystal element 22 is configured by sandwiching a liquid crystal layer (not illustrated) made of, for example, a VA (Vertical Alignment) mode or TN (Twisted Nematic) mode liquid crystal between a pair of electrodes (not illustrated). One (one end) of the pair of electrodes in the liquid crystal element 22 is connected to a drain of the TFT element 21 and one end of the auxiliary capacitance element 23, and the other (the other end) of the pair of electrodes is grounded. The auxiliary capacitance element 23 is a capacitance element for stabilizing an accumulated charge of the liquid crystal element 22. One end of the auxiliary capacitance element 23 is connected to the one end of the liquid crystal element 22 and the drain of the TFT element 21, and the other end of the auxiliary capacitance element 23 is connected to the auxiliary capacitance line Cs. The TFT element 21 is a switching element for supplying a picture voltage based on a picture signal D1 to the one end of the liquid crystal element 22 and the one end of the auxiliary capacitance element 23, and is configured of a MOS-FET (Metal Oxide Semiconductor-Field Effect Transistor). A gate and a source of the TFT element 21 are connected to the gate line G and the data line D, respectively, and the drain of the TFT element 21 is connected to the one end of the liquid crystal element 22 and the one end of the auxiliary capacitance element 23.

The picture signal processing section 41 performs, on the right-eye picture signal DR and the left-eye picture signal DL in the input picture signal Din, a frame-rate-increasing conversion which increases the frame rates of the right-eye picture stream and the left-eye picture stream by more than twice. More specifically, in the embodiment, the picture signal processing section 41 performs the frame-rate-increasing conversion by means of frame interpolation with use of a motion vector my (motion compensation) which will be described later so as to increase the frame rate of each picture stream (each of the right-eye and left-eye picture streams) by 2.5 times. Therefore, the picture signal processing section 41 generates a picture signal D1 configured of frame-rate-converted picture streams (the right-eye and left-eye picture streams). In this case, a period where the left-eye picture based on the picture signal D1 is displayed and a period where the right-eye picture based on the picture signal D1 is displayed in one frame period is called "L sub-frame period", and "R sub-frame period", respectively. Moreover, the picture signal processing section 41 generates a control signal CTL0 as a base of a control signal CTL for the shutter eyeglass device 6 which will be described later in response to synchronization signals (a vertical synchronization signal Vsync and a horizontal synchronization signal Hsync) supplied from outside to output the control signal CTL0 to the shutter control section 42. Note that the picture signal processing section 41 may perform predetermined image processing (such as a sharpness process or a gamma correction process) for an improvement in image quality. A specific configuration of the picture signal processing section 41 will be described later (refer to FIG. 3).

The shutter control section 42 controls the shutter eyeglass device 6 so as to perform an open/close operation in synchronization with a display switching timing between the picture streams (the right-eye and left-eye picture streams) of which the frame rates are converted by the picture signal processing section 41. More specifically, the shutter control section 42 generates, based on the control signal CTL0 supplied from the picture signal processing section 41, the control signal CTL for allowing the shutter eyeglass device 6 to perform an open/close operation in synchronization with the above-described display switching timing, and outputs the control signal CTL to the shutter eyeglass device 6. Note that in this case, the control signal CTL is a wireless signal such as an infrared signal, but may be a wired signal.

The timing control section 43 controls drive timing of the backlight drive section 50, the gate driver 52 and the data driver 51, and supplies, to the data driver 51, the picture signal D1 supplied from the picture signal processing section 41.

The gate driver 52 line-sequentially drives the pixels 20 in the liquid crystal display panel 2 along the above-described gate line G in response to timing control by the timing control section 43. Therefore, a display drive based on the picture signal D1 is performed on the liquid crystal display panel 2.

The data driver 51 supplies, to each of the pixels 20 of the liquid crystal display panel 2, a picture voltage based on the picture signal D1 supplied from the timing control section 43. More specifically, the data driver 51 performs D/A (digital/analog) conversion on the picture signal D1 to generate a picture signal (the above-described picture voltage) as an analog signal and output the analog signal to each of the pixels 20.

The backlight drive section 50 performs a lighting drive (a light emission drive) on the backlight 3 in response to timing control by the timing control section 43. Note that in the embodiment, such a lighting drive (light emission drive) on the backlight 3 may not be controlled.

Configuration of Shutter Eyeglass Device 6

When a viewer of the liquid crystal display 1 uses the shutter eyeglass device 6, stereoscopic vision is achievable, and the shutter eyeglass device 6 includes a left-eye lens 6L and a right-eye lens 6R. For example, liquid crystal shutters (light-shielding shutters) using a liquid crystal element (not illustrated) are arranged on the left-eye lens 6L and the right-eye lens 6R, respectively. An effective state (an open state, a transmission state) and an ineffective state (a close state, a shielding state) of a function of shielding incident light in each of the light-shielding shutters are controlled in a time-divisional manner by the control signal CTL supplied from the shutter control section 42.

More specifically, the shutter control section 42 controls the shutter eyeglass device 6 so as to alternately change the open/close states of the left-eye lens 6L and the right-eye lens 6R in synchronization with a display switching timing between the left-eye picture stream and the right-eye picture stream in the liquid crystal display 1. In other words, in the above-described L sub-frame period, the shutter control section 42 controls the shutter eyeglass device 6 so that the left-eye lens 6L is turned into the open state and the right-eye lens 6R is turned into the close state, and in the R sub-frame period, the shutter control section 42 controls the shutter eyeglass device 6 so that the right-eye lens 6R is turned into the open state and the left-eye lens 6L is turned into the close state. Therefore, in the time divisional drive system alternately displaying the right-eye picture and the left-eye picture by dividing one frame period into two periods, the viewer is allowed to watch the right-eye picture with his right eye and the left-eye picture with his left eye.

Specific Configuration of Picture Signal Processing Section 41

Figure 3:
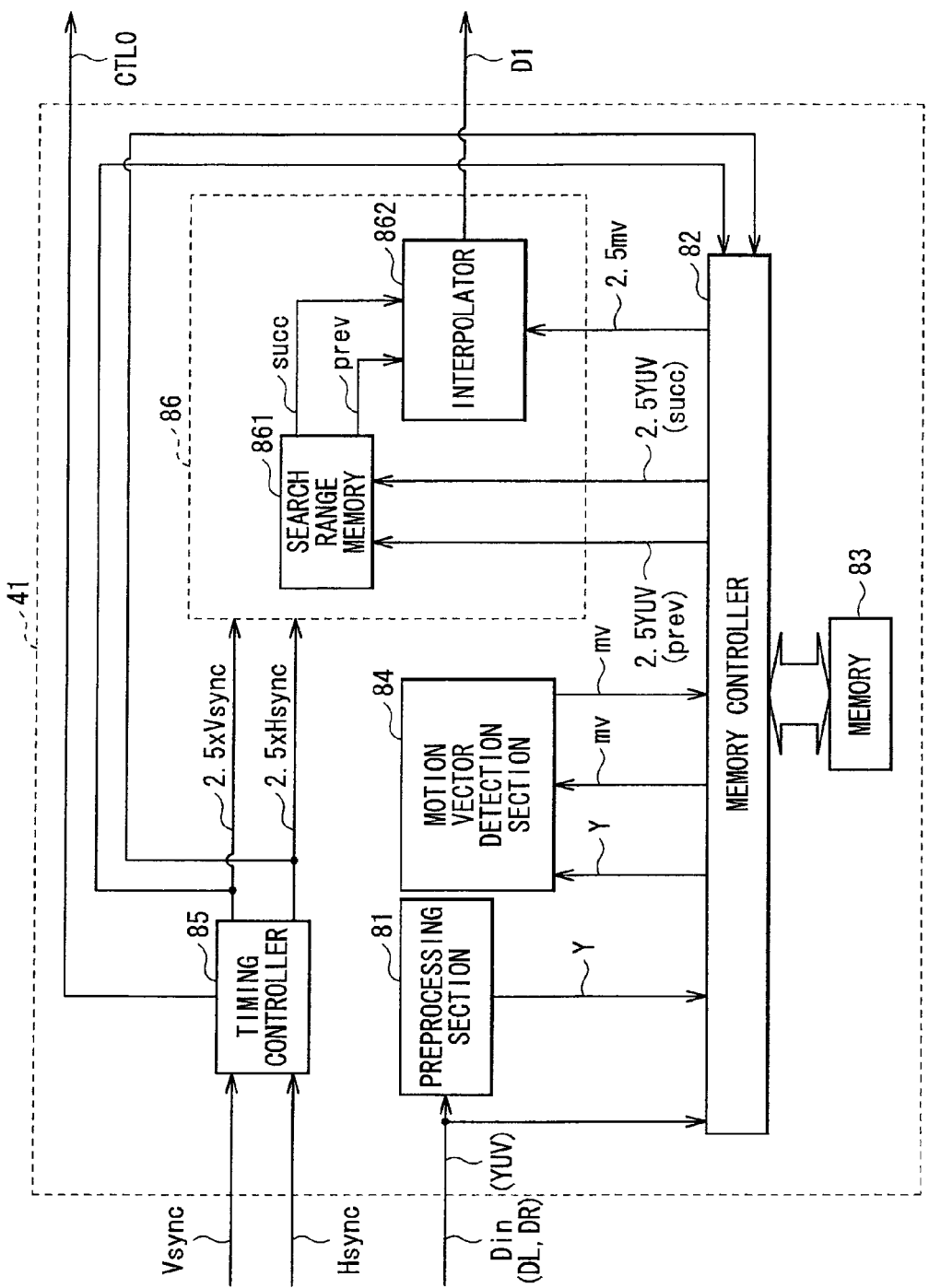
FIG. 3 is a block diagram illustrating a specific configuration example of a picture signal processing section illustrated in FIG. 1.

Next, referring to FIGS. 3 to 6, the specific configuration of the picture signal processing section 41 will be described below. FIG. 3 illustrates a specific block diagram of the picture signal processing section 41. The picture signal processing section 41 includes a preprocessing section 81, a memory controller 82, a memory 83, a motion vector detection section 84, a timing controller 85 and an interpolation section 86. The picture signal processing section 41 performs the frame-rate-increasing conversion on the input picture signal Din so as to increase the frame rate of each picture stream (each of the right-eye and left-eye picture streams) by 2.5 times by means of frame interpolation with use of the motion vector my, thereby generating the picture signal D1. More specifically, as will be described in detail below, prev (a picture in a previous frame) and succ (a picture in a present frame) are simultaneously read out of pictures stored in the memory 83 at 2.5-times speed, and interpolation is performed in the interpolation section 86 in a later stage. Therefore, the picture signal D1 with a speed 2.5 times faster than that of the input picture signal Din is generated.

The preprocessing section 81 performs a process (preprocessing) of separating a luminance signal Y from the input picture signal Din (a digital component signal YUV which is a signal subjected to a process such as tuning or decoding in a tuner, a decoder or the like (not illustrated)). The luminance signal Y separated in the preprocessing section 81 in such a manner is supplied to the memory controller 82 to be sequentially written to the memory 83 through the memory controller 82.

The timing controller 85 increases frequencies of the vertical synchronization signal Vsync and the horizontal synchronization signal Hsync supplied from outside by 2.5 times, and outputs the vertical synchronization signal Vsync and the horizontal synchronization signal Hsync to the memory controller 82 and the interpolation section 86 (the timing controller 85 generates synchronization signals represented by "2.5×Vsync" and "2.5×Hsync" in the drawing). More specifically, as illustrated in parts (A) and (B) in FIG. 4, for example, the frequency which is 48 Hz (or 50 Hz) of the vertical synchronization signal Vsync is increased by 2.5 times to generate a signal ("2.5×Vsync") with such a frequency (in this case, 120 Hz or 125 Hz).

The motion vector detection section 84 performs, for example, a motion vector detection process using block matching with use of the luminance signal Y in a present frame and the luminance signals Y in a previous frame and a following frame supplied from the memory 83 through the memory controller 82. The motion vector my of each frame detected in such a manner is written to the memory 83 through the memory controller 82, and is read out of the memory 83 to be supplied to the motion vector detection section 84 again as a reference in a motion vector detection process on a next frame.

The memory 83 is a memory for storing the above-described YIN signal, the above-described luminance signal Y and the above-described motion vector my in each frame.

The memory controller 82 controls a writing and reading operation of each of the YUV signal, the luminance signal Y and the motion vector my in each frame stored in the memory 83. More specifically, in particular, the memory controller 82 reads a YUV signal in succ (a present frame) and a YUV signal in prev (a previous frame) at 2.5-times speed with use of the synchronization signals "2.5×Vsync" and "2.5× Hsync" supplied from the timing controller 85. Therefore, YUV signals ("2.5 YUV(succ)" and "2.5 YUV(prev)") with such a 2.5-times higher frequency are supplied to a search range memory 861 in the interpolation section 86 which will be described later. Moreover, the memory controller 82 reads the motion vector my at 2.5-times speed with use of the synchronization signals "2.5×Vsync" and "2.5×Hsync". Therefore, an my signal ("2.5 mv") with a 2.5-times higher frequency is supplied to an interpolator 862 in the interpolation section 86 which will be described later. Note that 2.5-times speed operations of reading these signals are simultaneously performed on the right-eye picture and the left-eye picture.

The interpolation section 86 generates the picture signal D1 with use of the synchronization signals "2.5×Vsync" and "2.5×Hsync", the signals ("2.5YUV(succ)", "2.5YUV (prev)" and "2.5 mv") supplied from the memory controller 82 and an interpolation coefficient Relpos which will be described later. More specifically, a 2.5-times frame-rate-increasing conversion is performed on the input picture signal Din by means of frame interpolation with use of the motion vector my to generate the picture signal D1. The interpolation section 86 includes the search range memory 861 and the interpolator 862.

The search range memory 861 is a memory for storing YUV signals "2.5YUV(succ)" and "2.5YUV(prev)" supplied from the memory controller 82. These YUV signals are supplied to the interpolator 862 as YUV signals (signals in original frames) in succ (a present frame) and prev (a previous frame).

The interpolator 862 performs predetermined address calculation based on the motion vector my supplied from the memory controller 82 and the interpolation coefficient Relpos representing an interpolation position (an interpolation position on a time axis) of an interpolation frame generated with use of the motion vector my. More specifically, the interpolator 862 determines, based on the motion vector my and the interpolation coefficient Relpos, the address of a pixel of an original frame in the search range memory 861 used for determining a pixel value in an interpolation frame.

FIG. 5 conceptually illustrates a principle of address calculation by the interpolator 862.

In FIG. 5, (n−1) represents a pixel in an temporally earlier original frame (prev) in two original frames stored in the search range memory 861, and the address (a position in an x direction and a y direction on a screen) of each pixel is illustrated in a vertical axis direction. Moreover, n represents a pixel in a temporally later original frame in the two original frames, and the address of each pixel is illustrated in the vertical axis direction. On the other hand, i represents a pixel in an interpolation frame, and the address of each pixel is illustrated in the vertical axis direction. Note that a horizontal axis indicates time, and an interpolation frame i is located between the two original frames (n−1) and n (in this case, at a midway point therebetween as an example).

Moreover, in FIG. 5, "mv(x, y)$^{mn}$" is a motion vector my between the original frames (n−1) and n of an address (a reference address) (x, y) of a pixel (a reference pixel) to be formed at present in pixels in the interpolation frame i. Moreover, zeroPelPrev(x, y) is a value of a pixel at the reference address (x, y) in the original frame (n−1). Further, zeroPelSucc(x, y) is a value of a pixel at the reference address (x, y) in the original frame n.

The interpolator 862 determines an address of a pixel based on the reference address (x, y), an x-direction component mvX and a y-direction component mvY in the motion vector $mv(x, y)^{int}$ and the interpolation coefficient Relpos. More specifically, addresses of pixels in the original frames (n−1) and n used for determining a pixel value at the reference address (x, y) are determined based on them by the following expression (1).

$$\text{Address of pixel in original frame } (n-1) = (x + mvX \cdot Relpos, y + mvY \cdot Relpos)$$

$$\text{Address of pixel in original frame } n = (x - mvX \cdot (1-Relpos), y - mvY \cdot (1-Relpos)) \quad (1)$$

Moreover, the interpolator 862 outputs the addresses determined in such a manner to the search range memory 861 to read pixel values prev and succ at the addresses. Then, a pixel value Out at the reference address (x, y) in the interpolation frame i is calculated with use of these pixel values prev and succ and the interpolation coefficient Relpos by the following expression (2).

$$Out = prev \cdot (1-Relpos) + succ \cdot Relpos \quad (2)$$

In the interpolation section 86, such calculation is sequentially performed on pixels in the interpolation frame i (by sequentially updating the value (x, y) at the reference address) to form the interpolation frame i.

Next, referring to FIG. 6, a relationship between the interpolation coefficient Relpos and a set value of a position (an interpolation position between the original frames (n−1) and n) on a time axis of the interpolation frame i. Note that in FIG. 6, as an example, the original frame (n−1) is represented by a left-eye picture L0 and a right-eye picture R0, the original frame n is represented by a left-eye picture L2 and a right-eye picture R2, and the interpolation frame i is represented by L0.4, R0.4, L0.8, R0.8, L1.2, R1.2, L1.6 and R1.6.

As illustrated in FIG. 6, when the set value of the interpolation coefficient Relpos is "0", the position of the interpolation frame i is at an interpolation position corresponding to the original frames L0 and R0 or the original frames L2 and R2 (the positions of the original frames). Moreover, when the set value of the interpolation coefficient Relpos is "0.4", the position of the interpolation frame i is at an interpolation position corresponding to the interpolation frames L0.4 and R0.4 (a position "0.4" on the time axis in the case where the positions of the original frames L0 and R0 are "0" and the positions of the original frames L1 and R1 are "1"). Likewise, when the set value of the interpolation coefficient Relpos is "0.8", the position of the interpolation frame i is at an interpolation position corresponding to the interpolation frames L0.8 and R0.8 (a position "0.8" on the time axis in the case where the positions of the original frames L0 and R0 are "0" and the positions of the original frames L1 and R1 are "1"). Moreover, when the set value of the interpolation coefficient Relpos is "0.2", the position of the interpolation frame i is at an interpolation position corresponding to the interpolation frames L1.2 and R1.2 (a position "0.2" on the time axis in the case where the positions of the original frames L1 and R1 are "0" and the positions of the original frames L2 and R2 are "1"). Likewise, when the set value of the interpolation coefficient Relpos is "0.6", the position of the interpolation frame i is at an interpolation position corresponding to the interpolation frames L1.6 and R1.6 (a position "0.6" on the time axis in the case where the positions of the original frames L1 and R1 is "0" and the positions of the original frames L2 and R2 are "1").

Thus, in the embodiment, the interpolation positions (positions on the time axis) of interpolation frames are arranged at equal intervals between the original frames (in this case, the interpolation positions of the interpolation frames are arranged at intervals of 0.4). In other words, the value of the interpolation coefficient is increased in increments of 0.4 so as to reach the position of the original frames by 5 increments.

Functions and Effects of Picture Display System

Next, functions and effects of the picture display system according to the embodiment will be described below.

1. Stereoscopic Picture Display Operation

In the picture display system, as illustrated in FIG. 1, in the liquid crystal display 1, the picture signal processing section 41 performs the frame-rate-increasing conversion on the right-eye picture signal DR and the left-eye picture signal DL in the input picture signal Din to generate the picture signal D1. Next, the shutter control section 42 generates the control signal CTL corresponding to output timing (display switching timing) between the right-eye and left-eye picture streams on which such a frame-rate-increasing conversion is performed to output the control signal CTL to the shutter eyeglass device 6. Moreover, the picture signal D1 supplied from the picture signal processing section 41 is supplied to the data driver 51 through the timing control section 43. The data driver 51 performs D/A conversion on the picture signal D1 to generate a picture voltage as an analog signal. Then, a display drive operation is performed by a drive voltage supplied from the gate driver 52 and the data driver 51 to each of the pixels 20.

More specifically, as illustrated in FIG. 2, ON/OFF operations of the TFT element 21 are switched in response to a selection signal supplied from the gate driver 52 through the gate line G. Therefore, conduction is selectively established between the data line D and the liquid crystal element 22 and the auxiliary capacitance element 23. As a result, a picture voltage based on the picture signal D1 supplied from the data driver 51 is supplied to the liquid crystal element 22, and a line-sequential display drive operation is performed.

In the pixels 20 to which the picture voltage is supplied in such a manner, illumination light from the backlight 3 which is modulated in the liquid crystal display panel 2 is emitted as display light. Thus, picture based on the input picture signal Din are displayed on the liquid crystal display 1. More specifically, the left-eye picture and the right-eye picture in the picture signal D1 on which the frame-rate-increasing conversion is performed are alternately displayed in one frame period to perform a display drive operation by a time division drive.

Figure 7A:
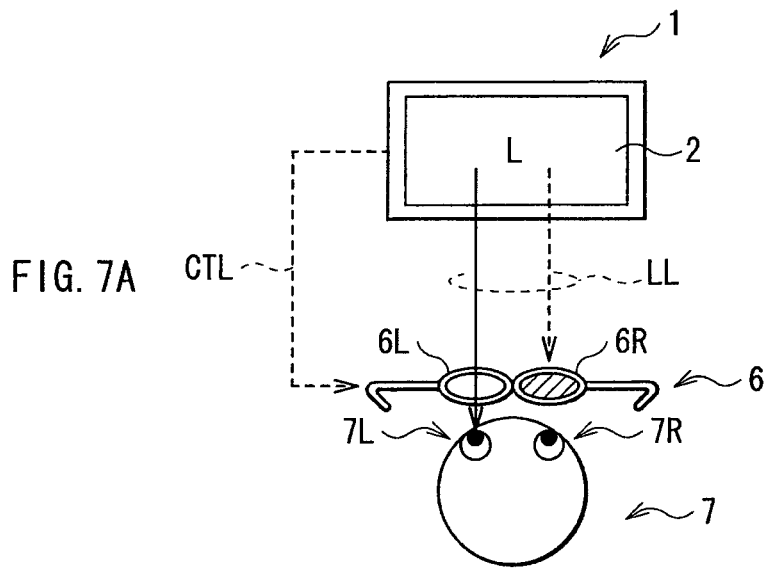
FIGS. 7A and 7B are schematic views illustrating a stereoscopic picture display operation in the picture display system illustrated in FIG. 1.
Figure 7B:
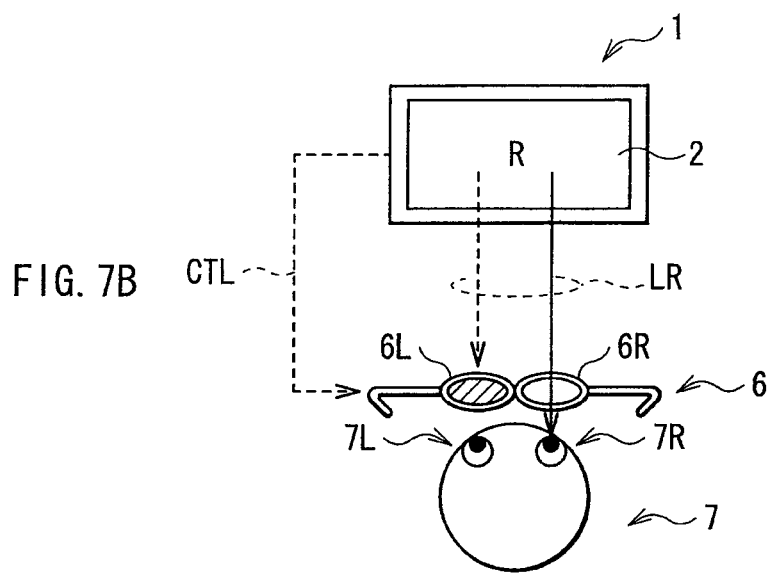

At this time, as illustrated in FIG. 7A, when the left-eye picture is displayed, in the shutter eyeglass device 6 used by a viewer 7, in response to the control signal CTL, a light-shielding function in the right-eye lens 6R is turned into an effective state, and the light-shielding function in the left-eye lens 6L is turned into an ineffective state. In other words, the left-eye lens 6L is turned into an open state for transmission of display light LL for display of the left-eye picture, and the right-eye lens 6R is turned into a close state for transmission of the display light LL. On the other hand, as illustrated in FIG. 7B, when the right-eye picture is displayed, in response to the control signal CTL, the light-shielding function in the left-eye lens 6L is turned into an effective state, and the light-shielding function in the right-eye lens 6R is turned into an ineffective state. In other words, the right-eye lens 6R is turned into an open state for transmission of display light LR for display of the right-eye picture, and the left-eye lens 6L is turned in a close state for transmission of the display light LR. Then, such states are alternately repeated in a time-divisional manner; therefore, when the viewer 7 wearing the shutter eyeglass device 6 watches a display screen of the liquid crystal display 1, a stereoscopic picture is viewable. In other words, the viewer 7 is allowed to watch the left-eye picture with his left eye 7L and the right-eye picture with his right eye 7R, and the left-eye picture and the right-eye picture have a parallax therebetween; therefore, the viewer 7 perceives the right-eye picture and the left-eye picture as a stereoscopic picture with a depth.

2. Flicker Reduction Operation Using Frame-Rate-Increasing Conversion

Next, referring to FIGS. 8 to 12, as one of characteristics parts of the disclosure, a flicker reduction operation with use of the frame-rate-increasing conversion in the case where pictures are viewed with use of the shutter eyeglass device 6 will be described in detail below in comparison with comparative examples (Comparative Examples 1 and 2).

Comparative Examples 1 and 2

Figure 8:
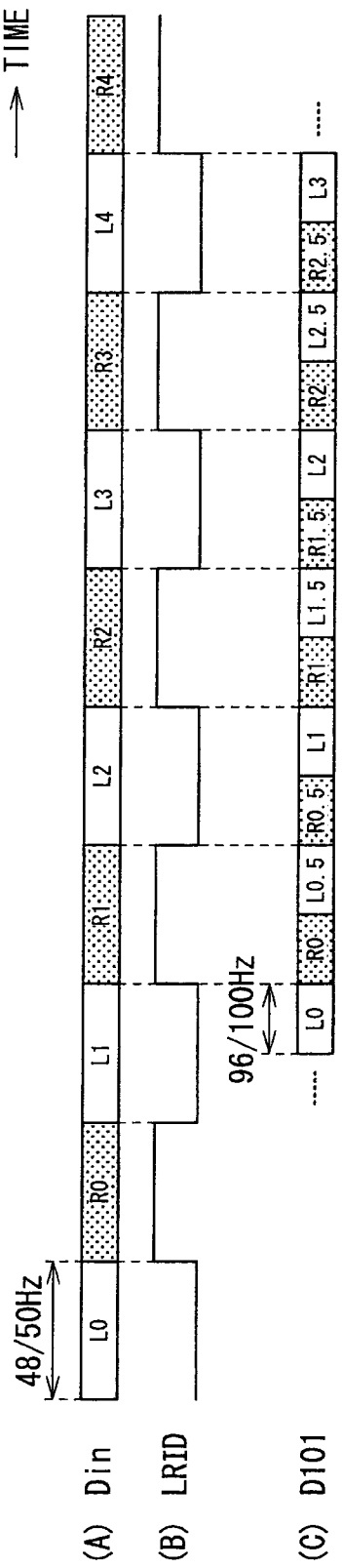
FIG. 8 is a timing chart for describing a frame-rate-increasing conversion according to Comparative Example 1.
Figure 9:
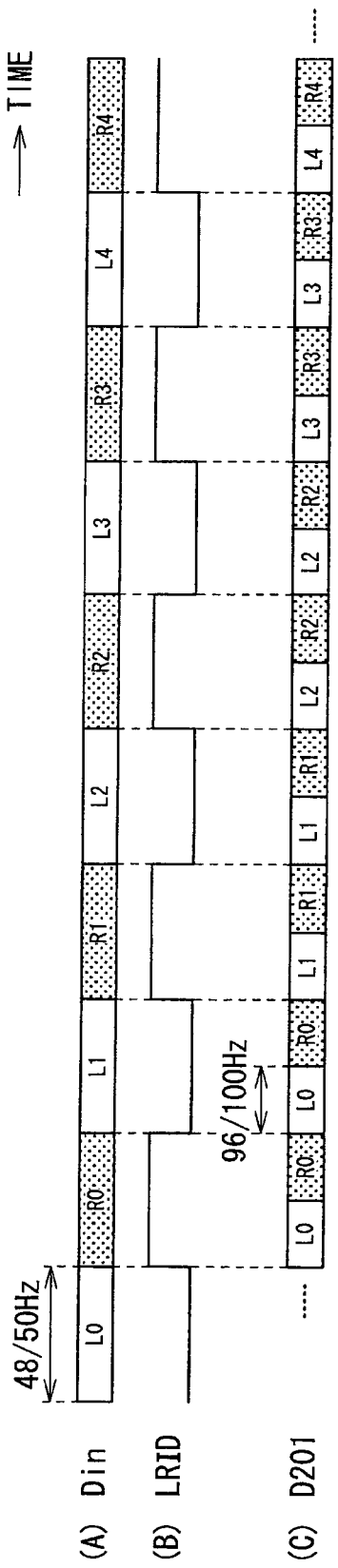
FIG. 9 is a timing chart for describing a frame-rate-increasing conversion according to Comparative Example 2.

FIG. 8 illustrates a frame-rate-increasing conversion according to Comparative Example 1 with a timing chart, and FIG. 9 illustrates a frame-rate-increasing conversion according to Comparative Example 2 with a timing chart. In FIGS. 8 and 9, parts (A), (B) and (C) indicate the input picture signal Din, a synchronization signal LRID used in the frame-rate-increasing conversion, and a picture signal D101 or D201 obtained by performing the frame-rate-increasing conversion on the input picture signal Din, respectively.

First, in the frame-rate-increasing conversion in Comparative Example 1, 2-times speed conversion is performed on the input picture signal Din (a signal for alternately outputting the left-eye original frames L0, L1, L2, . . . and right-eye original frames R0, R1, R2, . . . ) to generate the picture signal D101. More specifically, interpolation frames L0.5 and R0.5 are generated between, for example, the original frames L0 and R0 and the original frames L1 and R1 (in interpolation positions corresponding to the interpolation coefficient=0.5) by 2-times speed conversion with use of the motion vector my to generate the picture signal D1. Thus, 2-times speed conversion is performed on each of the left-eye picture and the right-eye picture in the input picture signal Din with a vertical frequency of, for example, 48 Hz or 50 Hz to generate the picture signal D101 with a vertical frequency of, for example, 96 Hz or 100 Hz.

On the other hand, in the frame-rate-increasing conversion in Comparative Example 2, 2-times conversion is performed on the input picture signal Din (a signal for alternately outputting the left-eye original frames L0, L1, L2, . . . and right-eye original frames R0, R1, R2, . . . ) to generate the picture signal D201. Therefore, as in the case of Comparative Example 1, 2-times speed conversion is performed on each of the left-eye picture and the right-eye picture in the input picture signal Din with a vertical frequency of, for example, 48 Hz or 50 Hz to generate the picture signal D201 with a vertical frequency of, for example, 96 Hz or 100 Hz. However, in Comparative Example 2, unlike Comparative Example 1 in which the interpolation frame is generated with use of the motion vector my, the interpolation frame is generated by reading the original frame twice. In other words, in the picture signal D201, frames L0, R0, L0, R0, L1, R1, . . . are supplied in this order.

However, in the case where stereoscopic picture display is performed with use of the picture signals D101 and D201 as resultants of the frame-rate-increasing conversions in Comparative Examples 1 and 2, respectively, and the pictures are viewed with use of the shutter eyeglass device 6, as will be described in detail below, the occurrence of flicker (plane flickers) is easily perceived.

Figure 10:
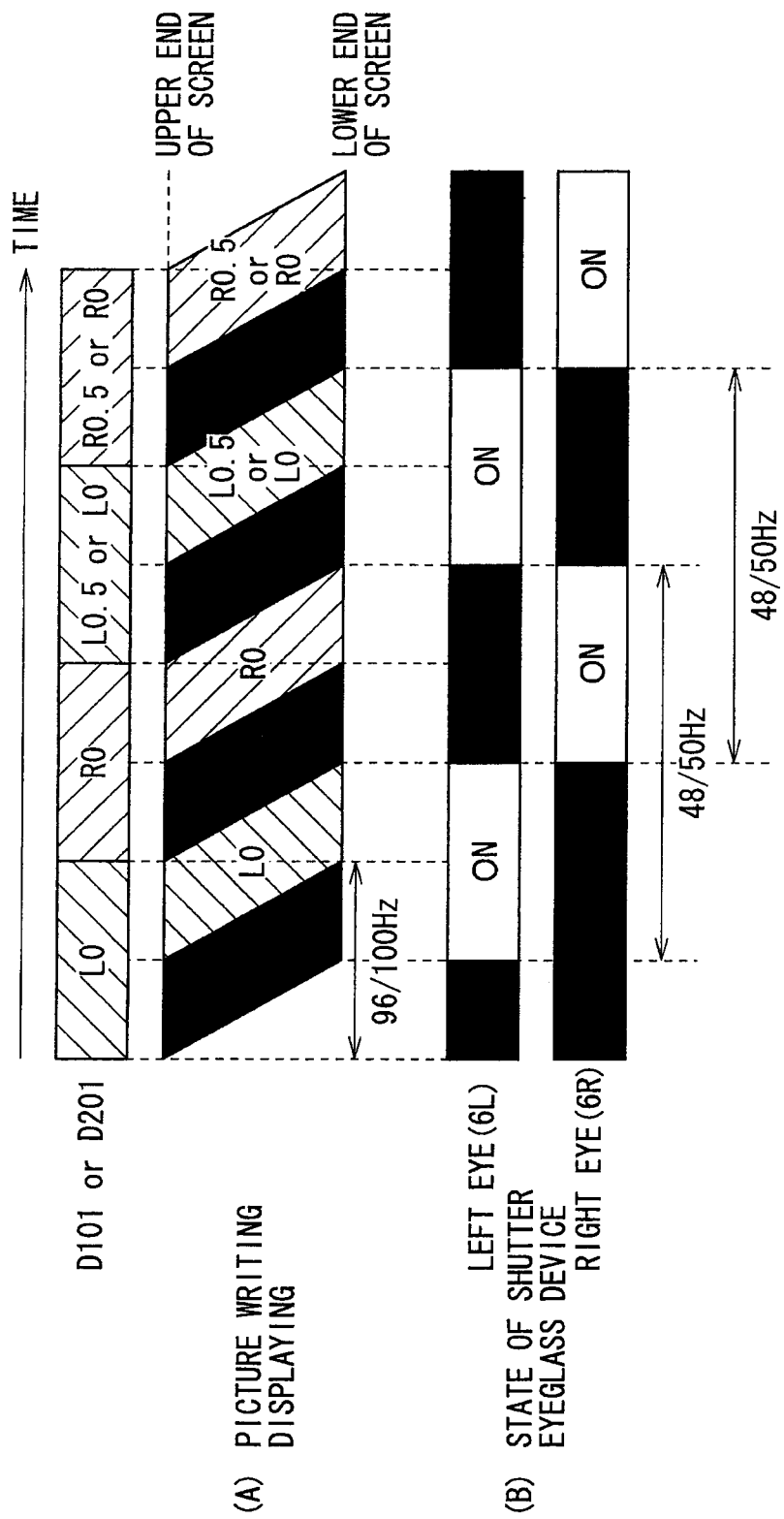
FIG. 10 is a timing chart illustrating a stereoscopic picture display operation according to Comparative Examples 1 and 2.

FIG. 10 illustrates a stereoscopic picture display operation according to Comparative Examples 1 and 2 with a timing chart, and a part (A) indicates a picture (the picture signal D101 or the picture signal D201) writing/displaying operation, and a part (B) indicates a state of the shutter eyeglass device 6 (the left-eye lens 6L and the right-eye lens 6R). Note that in the part (B) in FIG. 10, a black-colored period indicates a shutter close (OFF) period in the left-eye lens 6L or the right-eye lens 6R, and a white-colored period indicates a shutter open (ON) period in the left-eye lens 6L or the right-eye lens 6R, and the same applies to the following drawings.

As illustrated in FIG. 10, in the stereoscopic picture display operation, open/close operations of the left-eye lens (6L) and the right-eye lens (6R) in the shutter eyeglass device 6 are separately performed in synchronization with a display switching timing between the right-eye picture stream and the left-eye picture stream. Therefore, in principle, the period of the open/close operation of each lens in the shutter eyeglass device 6 is longer than a displaying period of each of the left-eye pictures and the right-eye pictures (the L sub-frame period or the R sub-frame period). In other words, the frequency (for example, 48 Hz or 50 Hz) of the open/close operation of each lens in the shutter eyeglass device 6 is equal to ½ of the frequency of each picture displaying period (the frequency of the L sub-frame period or the R sub-frame period: for example, 96 Hz or 100 Hz). Therefore, in the case where the frame-rate-increasing conversions in Comparative Examples 1 and 2 are used, when pictures are viewed with use of the shutter eyeglass device 6, the occurrence of flicker is easily perceived due to characteristics of human eyes.

Embodiment

On the other hand, in the embodiment, the picture signal processing section 41 performs the frame-rate-increasing conversion on the input picture signal Din so as to increase the frame rate of each picture stream (each of the right-eye and left-eye picture streams) by more than twice (in this case, 2.5 times), thereby generating the picture signal D1. Then, pictures are displayed based on the picture signal D1 as a resultant of such a frame-rate-increasing conversion through performing time-divisional switching of picture streams (the right-eye and left-eye picture streams) from one to another in order. Moreover, the shutter control section 42 controls the shutter eyeglass device 6 so as to perform an open/close operation in synchronization with a display switching timing between the picture streams (the right-eye and left-eye picture streams) on which the frame-rate-increasing conversion is performed by the picture signal processing section 41. A flicker reduction operation with use of such a frame-rate-increasing conversion according to the embodiment will be described in detail below.

Figure 11:
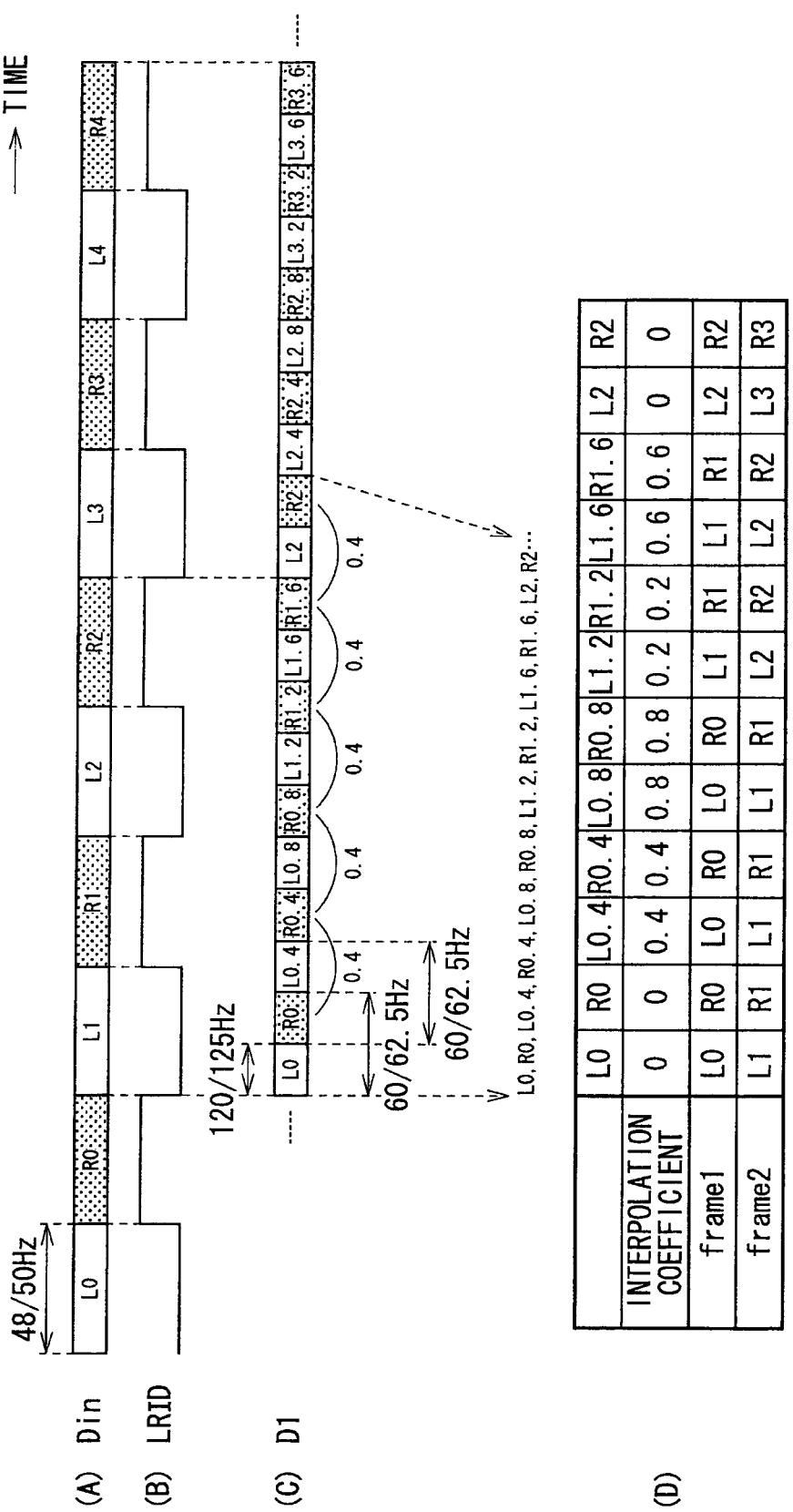
FIG. 11 is a timing chart for describing an example of a frame-rate-increasing conversion according to the embodiment.

FIG. 11 illustrates the frame-rate-increasing conversion according to the embodiment with a timing chart. In FIG. 11, parts (A), (B) and (C) indicate the input picture signal Din, the synchronization signal LRID and the picture signal D1, respectively. Moreover, a part (D) in FIG. 11 indicates the interpolation coefficient Relpos used in the frame-rate-increasing conversion corresponding to each interpolation frame and two original frames ("frame1" and "frame2") used to generate the interpolation frame.

In the frame-rate-increasing conversion according to the embodiment, 2.5-times speed conversion is performed on the input picture signal Din (a signal for alternately outputting left-eye original frames L0, L1, L2, . . . and right-eye original frames R0, R1, R2, . . . ) to generate the picture signal D1. More specifically, interpolation frames L0.4, R0.4, L0.8, R0.8, L1.2, R1.2, L1.6 and R1.6 are generated between original frames L0 and R0 and original frames L2 and R2 by 2.5-times speed conversion with use of the motion vector my to generate the picture signal D1. Thus, 2.5-times speed conversion is performed on each of the left-eye pictures and the right-eye pictures in the input picture signal Din with a vertical frequency of, for example, 48 Hz or 50 Hz to generate the picture signal D1 with a vertical frequency of, for example, 120 Hz or 125 Hz.

Figure 12:
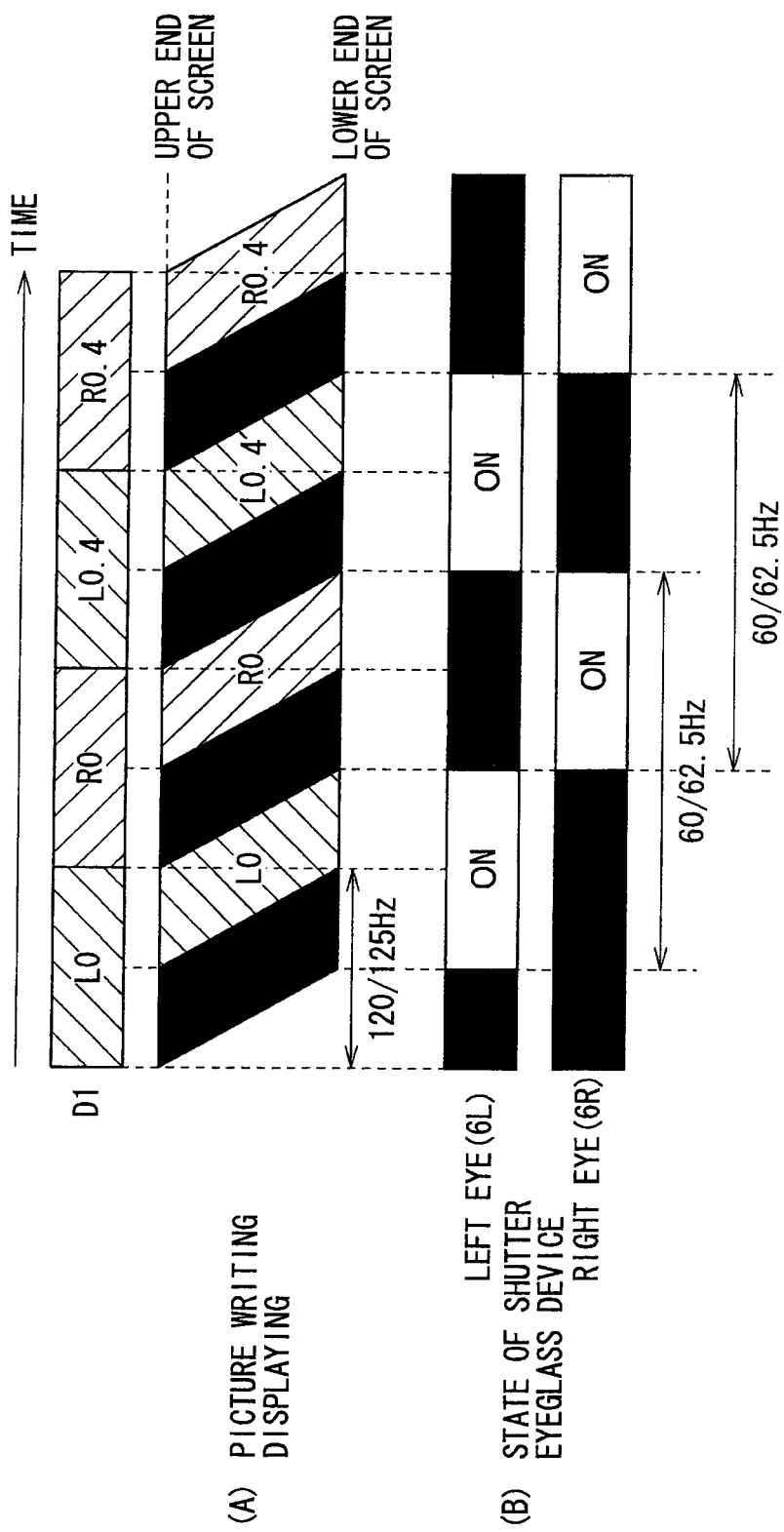
FIG. 12 is a timing chart illustrating a stereoscopic picture display operation according to the embodiment.

FIG. 12 illustrates the stereoscopic picture display operation according to the embodiment with a timing chart, and as in the case of FIG. 10, a part (A) indicates a picture (the picture signal D1) writing/displaying operation, and a part (B) indicates a state of the shutter eyeglass device 6 (the left-eye lens 6L and the right-eye lens 6R).

As illustrated in FIG. 12, in the case where the vertical frequency of each of the left-eye picture and the right-eye picture in the picture signal D1 (the frequency of each of the L sub-frame period and R sub-frame period) is, for example, 120 Hz or 125 Hz, the frequency of the open/close operation of each lens in the shutter eyeglass device 6 is as follows. The left-eye lens (6L) and the right-eye lens (6R) each has an open/close operation frequency of 60 Hz or 62.5 Hz which is higher than that in Comparative Examples 1 and 2 (48 Hz or 50 Hz).

Thus, in the embodiment, picture display with use of picture streams (the left-eye and right-eye picture streams) subjected to the frame-rate-increasing conversion which increases the frame rate by more than twice (in this case, 2.5 times) and the open/close operation of the shutter eyeglass device 6 in synchronization with a display switching timing between the picture streams are performed. Therefore, compared to Comparative Examples 1 and 2, the period of the open/close operation of the shutter eyeglass device 6 is shortened (the frequency of the open/close operation is increased).

As described above, in the embodiment, the frame-rate-increasing conversion is performed on the input picture signal Din so as to increase the frame rate of each of the picture streams (the right-eye picture and left-eye picture streams) by more than twice (in this case, 2.5 times), and picture display is performed through performing time-divisional switching of the picture streams (the right-eye and left-eye picture streams) from one to another in order, and the shutter eyeglass device 6 is controlled so as to perform the open/close operation in synchronization with a display switching timing between the picture streams on which the frame-rate-increasing conversion is performed; therefore, the period of the open/close operation of the shutter eyeglass device 6 is allowed to be shortened (the frequency of the open/close operation is allowed to be increased). Therefore, the occurrence of flicker when the pictures are viewed with use of the shutter eyeglass device 6 is allowed to be reduced.

Moreover, the interpolation positions of interpolation frames are arranged at equal intervals between the original frames; therefore, judders when the pictures are viewed are allowed to be largely reduced, thereby performing smooth picture display.

Modifications

Next, modifications (Modifications 1 to 4) of the disclosure will be described below. Note that like components are denoted by like numerals as of the above-described embodiment and will not be further described.

Modification 1

Figure 13:
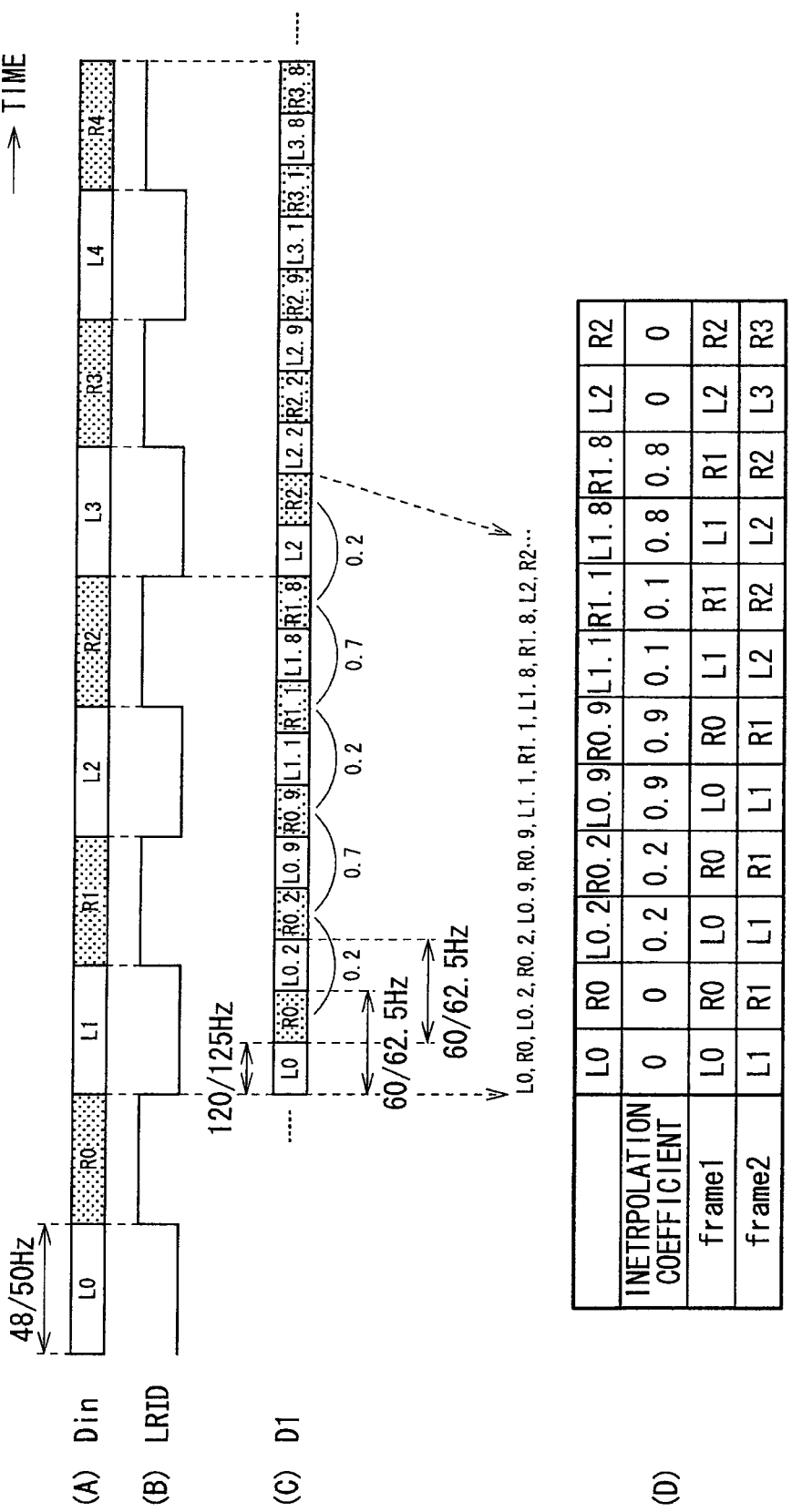
FIG. 13 is a timing chart for describing an example of a frame-rate-increasing conversion according to Modification 1.

FIG. 13 illustrates a frame-rate-increasing conversion according to Modification 1 with a timing chart. In FIG. 13, parts (A), (B) and (C) indicate the input picture signal Din, the synchronization signal LRID and the picture signal D1, respectively. Moreover, a part (D) in FIG. 13 indicates the interpolation coefficient Relpos used in the frame-rate-increasing conversion corresponding to each interpolation frame and two original frames ("frame1" and "frame2") used to generate the interpolation frame.

In the modification, as in the case of the above-described embodiment, 2.5-times speed conversion with use of the motion vector my is performed on the input picture signal Din (a signal for alternately outputting the left-eye original frames L0, L1, L2, . . . and the right-eye original frames R0, R1, R2, . . . ) to generate the picture signal D1. Therefore, as in the case of the above-described embodiment, 2.5-times speed conversion is performed on each of the left-eye pictures and the right-eye pictures in the input picture signal with a vertical frequency of, for example, 48 Hz or 50 Hz to generate the picture signal D1 with a vertical frequency of, for example, 120 Hz or 125 Hz.

However, in the modification, unlike the above-described embodiment in which the interpolation positions of interpolation frames are arranged at equal intervals between the original frames, the interpolation positions of interpolation frames are arranged at unequal intervals between the original frames. More specifically, in an example illustrated in FIG. 13, the interpolation positions of the interpolation frames are arranged at intervals of 0.2 and 0.7. In other words, the value of the interpolation coefficient is increased in increments of 0.2 and 0.7 so as to reach the position of the original frames by 5 increments. Therefore, in the picture signal D1, interpolation frames L0.2, R0.2, L0.9, R0.9, L1.1, R1.1, L1.8 and R1.8 are generated between the original frames L0 and R0 and the original frames L2 and R2. In other words, in this example, the position of each interpolation frame is arranged closer to the original frame.

in the modification with such a configuration, the same effects as those in the above-described embodiment are also obtainable by the same function as those in the embodiment. In other words, the occurrence of flicker when pictures are viewed with use of the shutter eyeglass device 6 is allowed to be reduced.

Moreover, in the modification, the interpolation positions of the interpolation frames are arranged at unequal intervals between the original frames; therefore, judders which occur when pictures are viewed are allowed to be reduced to some extent, thereby performing slightly smoother picture display.

Further, in the modification, the interpolation position of each interpolation frame is arranged closer to the original frame; therefore, there are interpolation frames arranged at larger intervals, and compared to the case where the interpolation positions of interpolation frames are arranged at equal intervals, judders of pictures from one interpolation frame to another are allowed to be increased. In other words, for example, when the frame-rate-increasing conversion is performed on film signals with use of a motion vector, while judders are reduced by the frame-rate-increasing conversion, the degree of the reduction is allowed to be lessened. This is advantageous to film signals.

Modification 2

Figure 14:
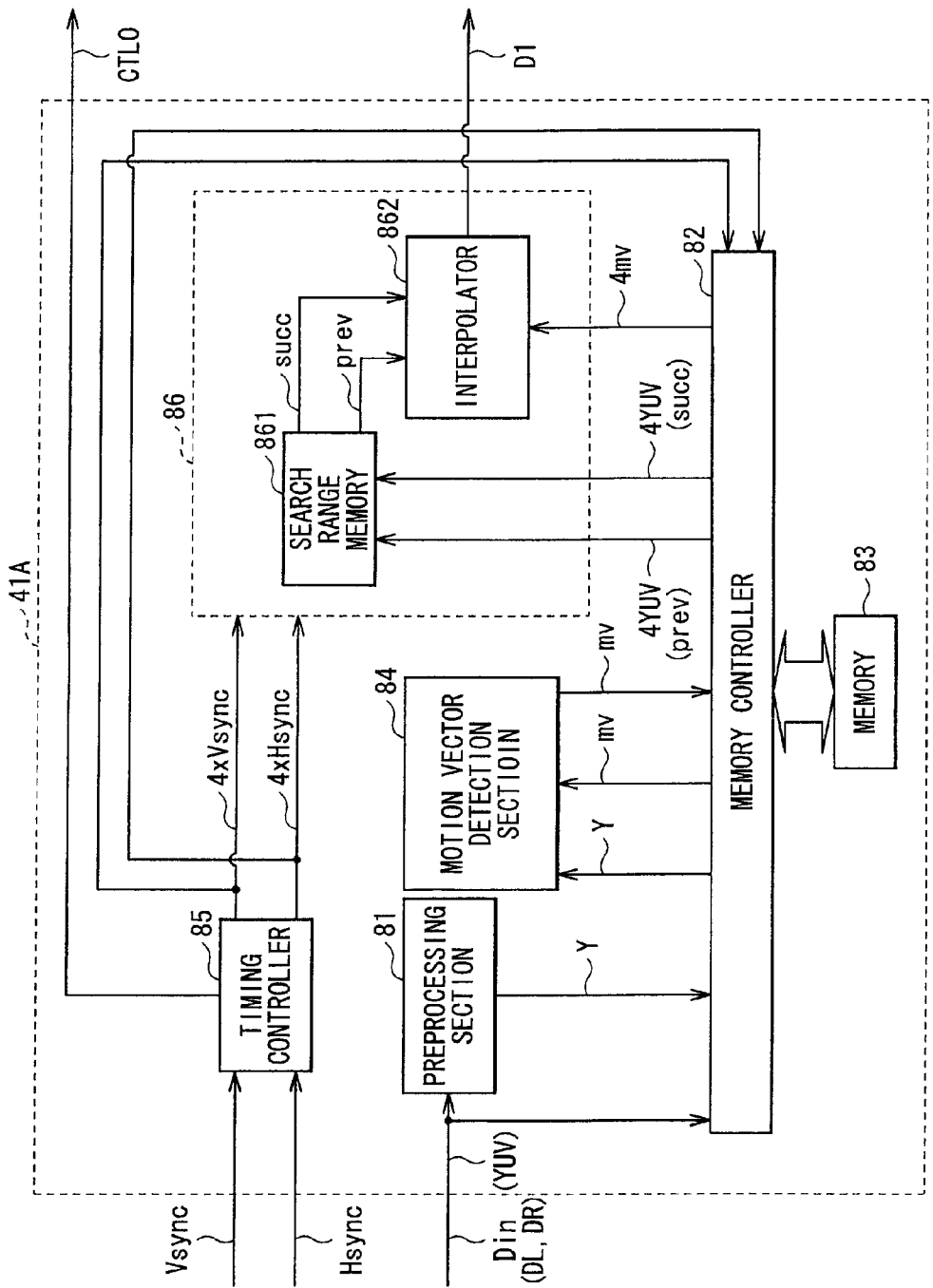
FIG. 14 is a block diagram illustrating a configuration example of a picture signal processing section according to Modification 2.

FIG. 14 illustrates a block diagram of a picture signal processing section (a picture signal processing section 41A) according to Modification 2. The picture signal processing section 41A according to Modification 2 corresponds to the picture signal processing section 41 according to the above-described embodiment performing 4-times speed conversion on the input picture signal Din to generate the picture signal D1, and other configurations of the picture signal processing section 41A are the same as those in the above-described embodiment.

More specifically, in the picture signal processing section 41A, the timing controller 85 increases the frequencies of the vertical synchronization signal Vsync and the horizontal synchronization signal Hsync by 4 times to output the vertical synchronization signal Vsync and the horizontal synchronization signal Hsync to the memory controller 82 and the interpolation section 86 (to generate synchronization signals represented by "4×Vsync" and "4×Hsync" in the drawing). Moreover, the memory controller 82 reads a YUV signal in succ and a YUV signal in prev at 4-times speed with use of the synchronization signals "4×Vsync" and "4×Hsync" supplied from the timing controller 85. Therefore, YUV signals ("4YUV(succ)" and "4YUV(prev)") with a 4-times higher frequency are supplied to the search range memory 861 in the interpolation section 86. Moreover, the memory controller 82 reads the motion vector my at 4-times speed with use of the synchronization signals "4×Vsync" and "4×Hsync". Therefore, an my signal ("4 mv") with a 4-times higher frequency is supplied to the interpolator 862 in the interpolation section 86.

Figure 15:
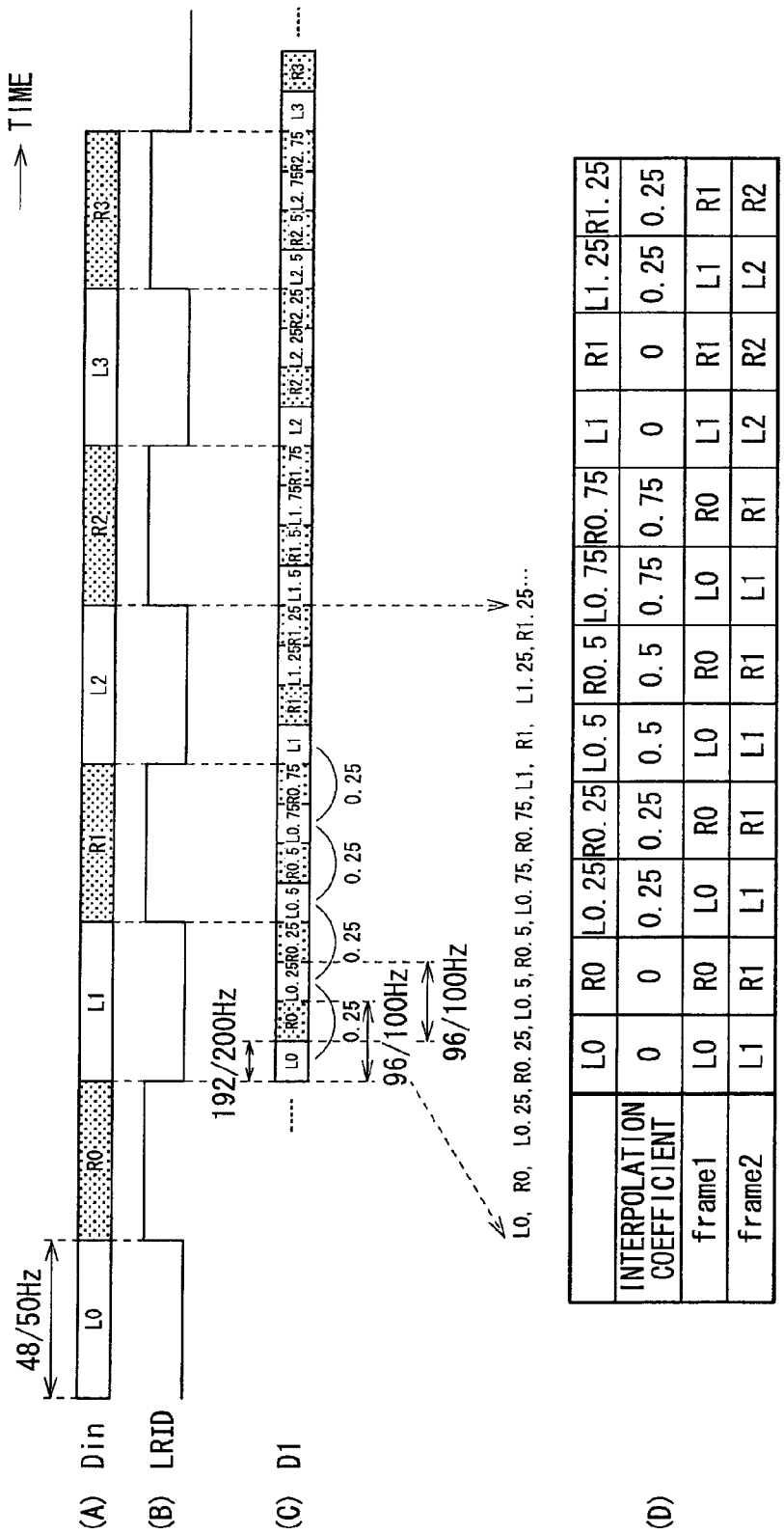
FIG. 15 is a timing chart for describing an example of a frame-rate-increasing conversion according to Modification 2.
Figure 16:
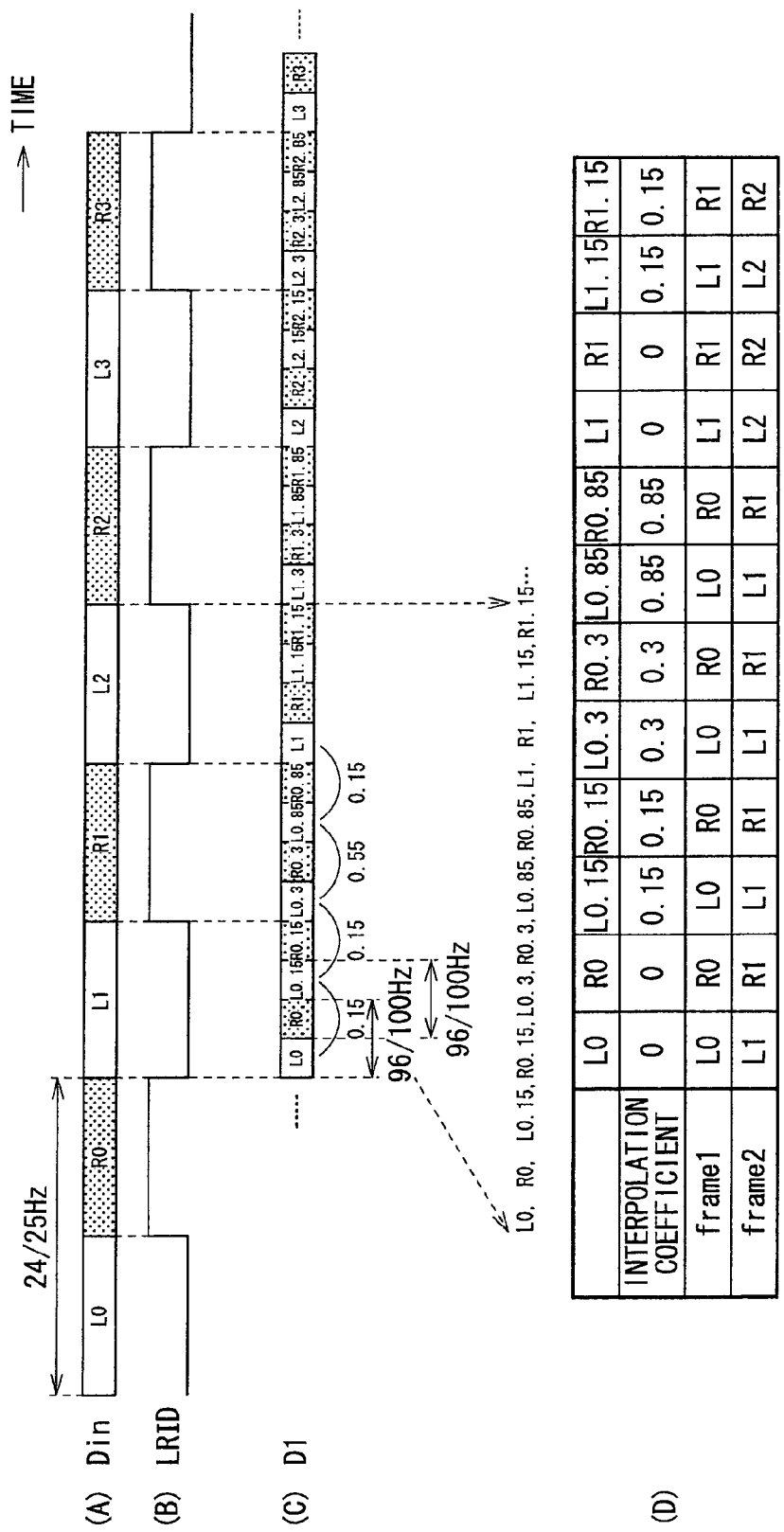
FIG. 16 is a timing chart for describing another example of the frame-rate-increasing conversion according to Modification 2.

In this case, FIGS. 15 and 16 illustrate the frame-rate-increasing conversion according to Modification 2 with timing charts. In FIGS. 15 and 16, parts (A), (B) and (C) indicate the input picture signal Din, the synchronization signal LRID and the picture signal D1, respectively. Moreover, a part (D) in FIG. 15 and a part (D) in FIG. 16 indicate the interpolation coefficient Relpos used in the frame-rate-increasing conversion corresponding to each interpolation frame and two original frames ("frame1" and "frame2") used to generate the interpolation frame.

First, in an example illustrated in FIG. 15, 4-times speed conversion with use of the motion vector my is performed on the input picture signal Din (a signal for alternately outputting left-eye original frames L0, L1, L2, . . . and right-eye original frames R0, R1, R2, . . . ) to generate the picture signal D1. Therefore, 4-times speed conversion is performed on the left-eye pictures and the right-eye pictures in the input picture signal Din with a vertical frequency of, for example, 48 Hz or 50 Hz to generate the picture signal D1 with a vertical frequency of, for example, 192 Hz or 200 Hz. Moreover, in the example illustrated in FIG. 15, the interpolation positions of interpolation frames are arranged at equal intervals between the original frames. More specifically, the interpolation positions of the interpolation frames are arranged at intervals of 0.25. In other words, the value of the interpolation coefficient is increased in increments of 0.25 so as to reach the position of the original frames by 4 increments. Therefore, in the picture signal D1, interpolation frames L0.25, R0.25, L0.5, R0.5, L0.75 and R0.75 are generated between the original frames L0 and R0 and the original frames L1 and R1.

On the other hand, also in an example illustrated in FIG. 16, 4-times speed conversion with use of the motion vector my is performed on the input picture signal Din (a signal for alternately outputting left-eye original frames L0, L1, L2, . . . and right-eye original frames R0, R1, R2, . . . ) to generate the picture signal D1. Therefore, also in this example, 4-times speed conversion is performed on the left-eye pictures and the right-eye pictures in the input picture signal Din with a vertical frequency of, for example, 48 Hz or 50 Hz to generate the picture signal D1 with a vertical frequency of, for example, 192 Hz or 200 Hz. However, in the example illustrated in FIG. 16, unlike the example illustrated in FIG. 15, the interpolation positions of the interpolation frames are arranged at unequal intervals between the original frames. More specifically, the interpolation positions of the interpolation frames are arranged at intervals of 0.15 and 0.55. In other words, the value of the interpolation coefficient is increased in increments of 0.15 and 0.55 so as to reach the position of the original frames by 4 increments. Therefore, in this case, in the picture signal D1, interpolation frames L0.15, R0.15, L0.3, R0.3, L0.85 and R085 are generated between the original frames L0 and R0 and the original frames L1 and R1. In this example, the interpolation position of each interpolation frame is arranged closer to the position of the original frame.

In the modification with such a configuration, the same effects as those in the above-described embodiment or Modification 1 are obtainable by the same functions as those in the embodiment or Modification 1. In other words, the occurrence of flicker when pictures are viewed with use of the shutter eyeglass device 6 is allowed to be reduced.

Modification 3

Figure 17:
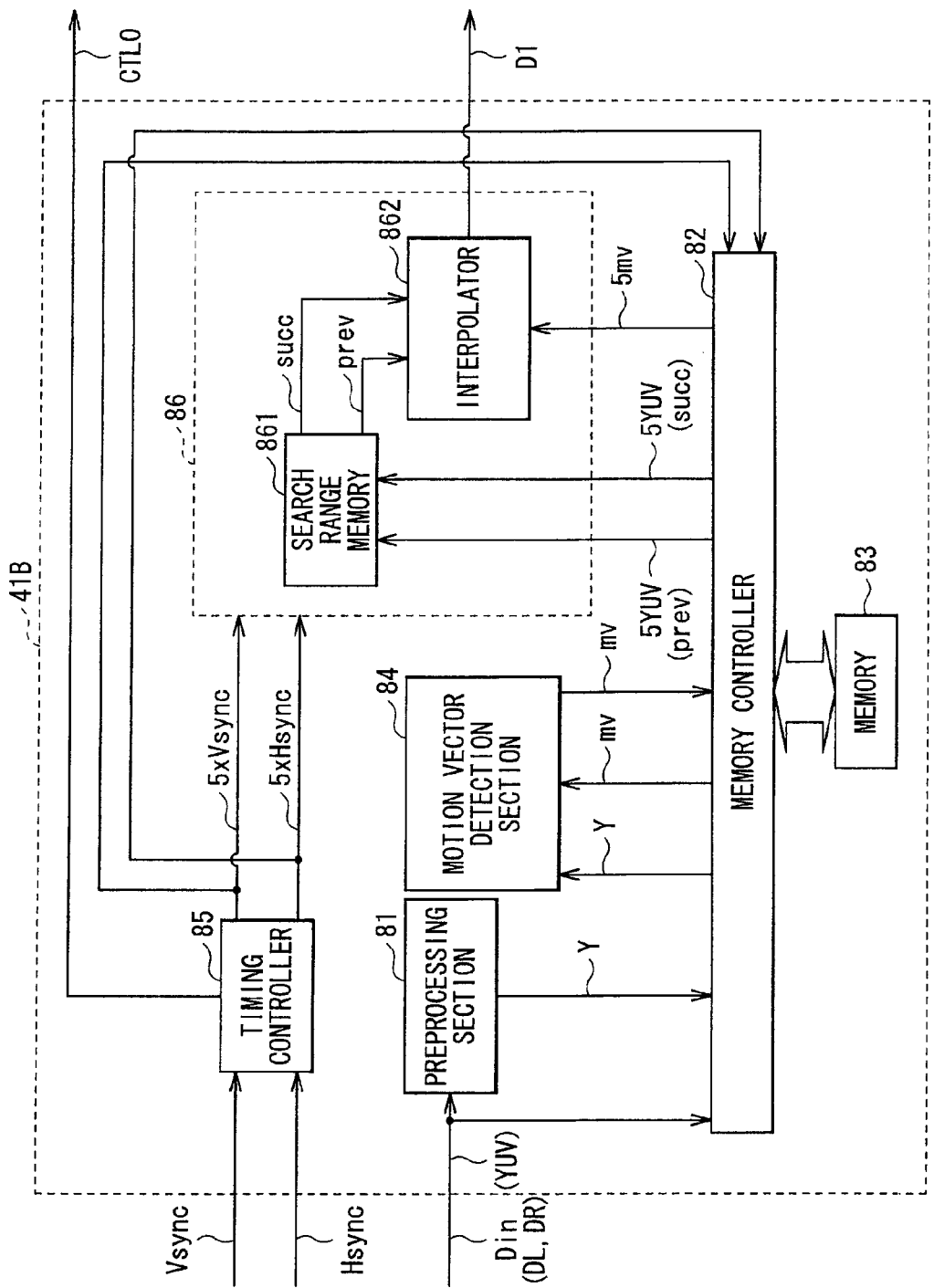
FIG. 17 is a block diagram illustrating a configuration example of a picture signal processing section according to Modification 3.

FIG. 17 illustrates a block diagram of a picture signal processing section (a picture signal processing section 41B) according to Modification 3. The picture signal processing section 41B according to Modification 3 corresponds to the picture signal processing section 41 according to the embodiment using a consecutive writing system which will be described below.

In the picture signal processing section 41B according to Modification 3, as in the case of the picture signal processing section 41, 2.5-times speed conversion with use of the motion vector my is performed on the input picture signal Din. Moreover, the picture signal processing section 41B performs output control to allow the pictures (the left-eye pictures and the right-eye pictures) in frame-rate-converted picture streams to be outputted a plurality of consecutive times (two consecutive times in this case) for each, while allowing the frame-rate-converted picture streams (left-eye and right-eye picture streams) to be time-divisionally switched from one to another in order. In other words, in this case, the picture signal D1 is generated so as to output the pictures in order of the left-eye picture, the left-eye picture, the right-eye picture and the right-eye picture in one frame period. Therefore, in the modification, 5-times speed conversion is performed on the left-eye pictures and the right-eye pictures in the input picture signal Din with a vertical frequency of, for example, 48 Hz or 50 Hz to generate the picture signal D1 with a vertical frequency of, for example, 240 Hz or 250 Hz. Note that in the modification, as will be described later, the shutter control section 42 generates the control signal CTL so that the shutter eyeglass device 6 is turned to an open state after second writing of a picture (the left-eye picture or the right-eye picture) is completed.

More specifically, in the picture signal processing section 41B, the timing controller 85 increases the frequencies of the vertical synchronization signal Vsync and the horizontal synchronization signal Hsync by 5 times to output the vertical synchronization signal Vsync and the horizontal synchronization signal Hsync to the memory controller 82 and the interpolation section 86 (to generate synchronization signals represented by "5×Vsync" and "5×Hsync" in the drawing). Moreover, the memory controller 82 reads a YUV signal in succ and a YUV signal in prev at 5-times speed with use of the synchronization signals "5×Vsync" and "5×Hsync" supplied from the timing controller 85. Therefore, YUV signals ("5YUV(succ)" and "5YUV(prev)") with a 5-times higher frequency are supplied to the search range memory 861 in the interpolation section 86. Moreover, the memory controller 82 reads the motion vector mv at 5-times speed with use of the synchronization signals "5×Vsync" and "5×Hsync". Therefore, an mv signal ("5 mv") with a 5-times higher frequency is supplied to the interpolator 862 in the interpolation section 86.

Figure 18:
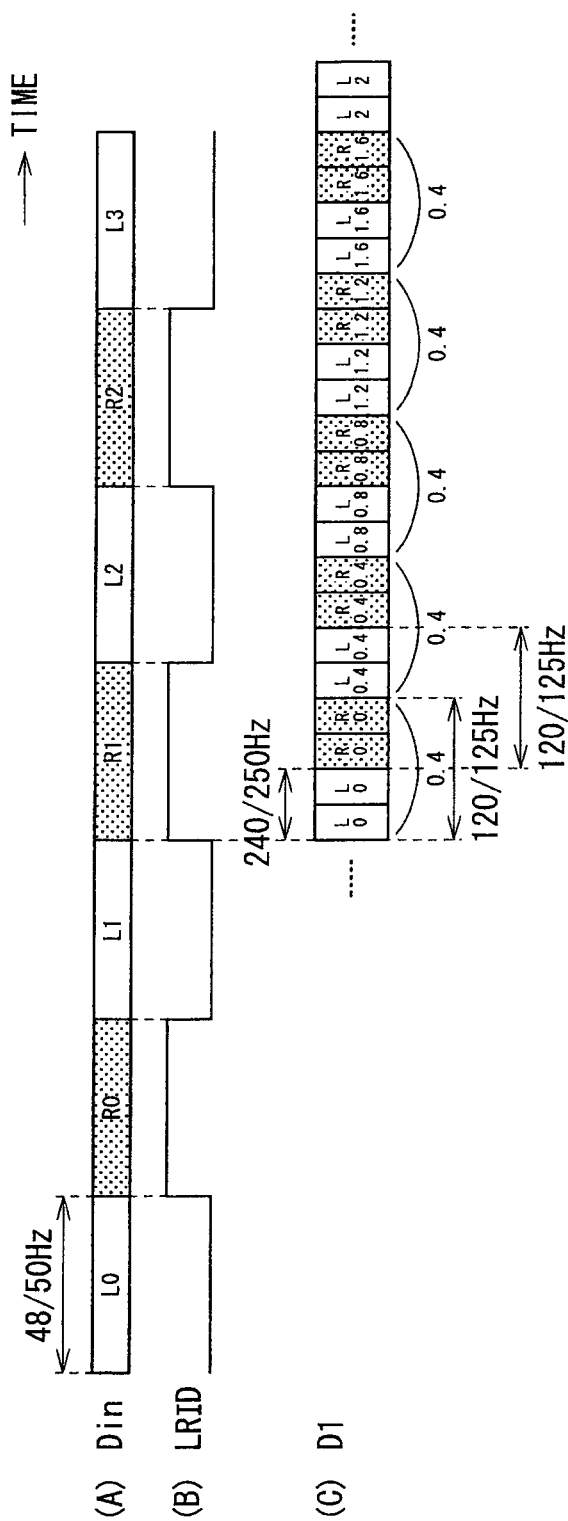
FIG. 18 is a timing chart for describing an example of a frame-rate-increasing conversion according to Modification 3.

More specifically, the frame-rate-increasing conversion according to the modification is performed as illustrated in, for example, parts (A) to (C) in FIG. 18. In other words, 5-times speed conversion with use of the motion vector mv is performed on the input picture signal Din (a signal for alternately outputting left-eye original frames L0, L1, L2, . . . and right-eye original frames R0, R1, R2, . . . ) to generate the picture signal D1. Therefore, 5-times speed conversion is performed on the left-eye pictures and the right-eye pictures in the input picture signal Din with a vertical frequency of, for example, 48 Hz or 50 Hz to generate the picture signal D1 with a vertical frequency of, for example, 240 Hz or 250 Hz. Moreover, in the example illustrated in FIG. 18, the interpolation positions of the interpolation frames are arranged at equal intervals between the original frames. More specifically, the interpolation positions of the interpolation frames are arranged at intervals of 0.4. In other words, the value of the interpolation coefficient is increased in increments of 0.4 so as to reach the position of the original frames by 5 increments. Therefore, in the picture signal D1, interpolation frames L0.4, R0.4, L0.8, R0.8, L1.2, R1.2, L1.6 and R1.6 are generated between the original frames L0 and R0 and the original frames L2 and R2. Further, as described above, each of the pictures (the left-eye pictures and the right-eye pictures) is supplied two consecutive times.

Figure 19:
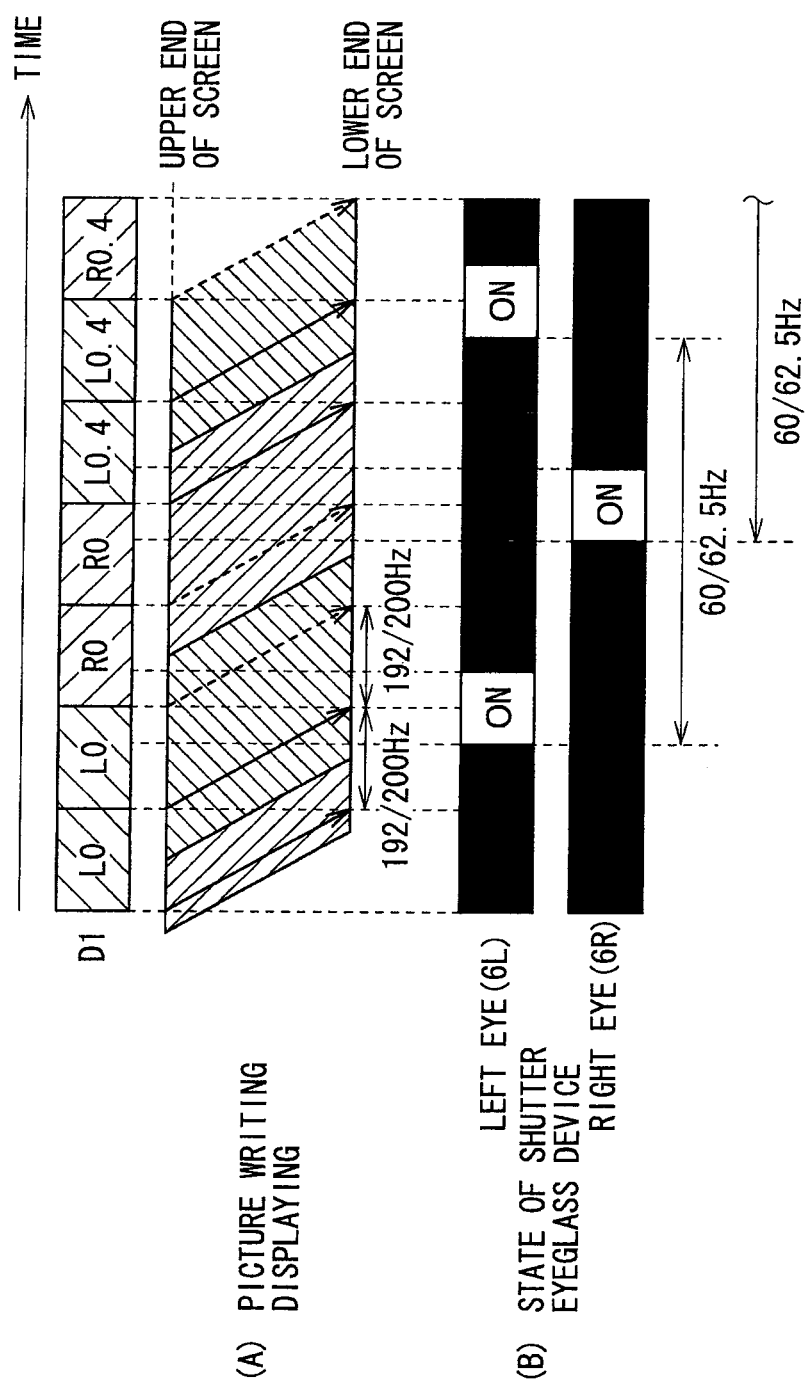
FIG. 19 is a timing chart illustrating a stereoscopic picture display operation according to Modification 3.

In this case, FIG. 19 illustrates a stereoscopic picture display operation by the consecutive writing system according to Modification 3 with a timing chart, and as in the case of FIGS. 10 and 12, a part (A) indicates a picture writing/displaying operation, and a part (B) indicates a state of the shutter eyeglass device 6 (the left-eye lens 6L and the right-eye lens 6R).

In the stereoscopic picture display operation by the consecutive writing system, as illustrated in the part (A) in FIG. 19, in each L sub-frame period of one frame period, the left-eye picture is written to the liquid crystal display panel 2 two consecutive times to display the left-eye picture L0, L0.4 or the like. Moreover, likewise, in each R sub-frame period, the right-eye picture is written to the liquid crystal display panel 2 two consecutive times to display the right-eye picture R0, R0.4 or the like. In other words, in one frame period, for example, the left-eye picture L0, the left-eye picture L0, the right-eye picture R0, the right-eye picture R0, the left-eye picture L0.4, the left-eye picture L0.4, the right-eye picture R0.4, . . . are displayed in this order. Then, as illustrated in the part (B) in FIG. 19, in each of the sub-frame periods (the L sub-frame period and the R sub-frame period), the shutter eyeglass device 6 is turned to an open state in a period where second writing of a picture (the left-eye picture or the right-eye picture) is completed and a liquid crystal maintains desired gradation luminance on a whole screen.

Therefore, in the modification, in the case where the vertical frequency of each of the left-eye picture and the right-eye picture in the picture signal D1 (the frequency of each of the L sub-frame period and the R sub-frame period) is, for example, 192 Hz or 200 Hz, the frequency of the open/close operation of each lens in the shutter eyeglass device 6 is as follow. The frequency of the open/close operation of each of the left-eye lens (6L) and the right-eye lens (6R) is 60 Hz or 62.5 Hz which is the same as that in the above-described embodiment, and is higher than that in Comparative Examples 1 and 2 (48 Hz or 50 Hz). Therefore, in the modification, the same effects as those in the above-described embodiment are obtainable by the same effects as those in the embodiment. In other words, the occurrence of flicker when the pictures are viewed with use of the shutter eyeglass device 6 is allowed to be reduced.

Moreover, in the modification, the stereoscopic picture display operation by the consecutive writing system is performed; therefore, after the liquid crystal sufficiently responds by consecutive writing, the shutter eyeglass device 6 is allowed to be turned to an open state. Therefore, as liquid crystal response characteristics are complemented, crosstalk between the left-eye picture and the right-eye picture is allowed to be reduced.

Note that in the modification, the case where the interpolation positions of the interpolation frames are arranged at equal intervals between the original frames is described; however, the interpolation positions of the interpolation frames may be arranged at unequal intervals between the original frames.

Modification 4

Figure 20A:
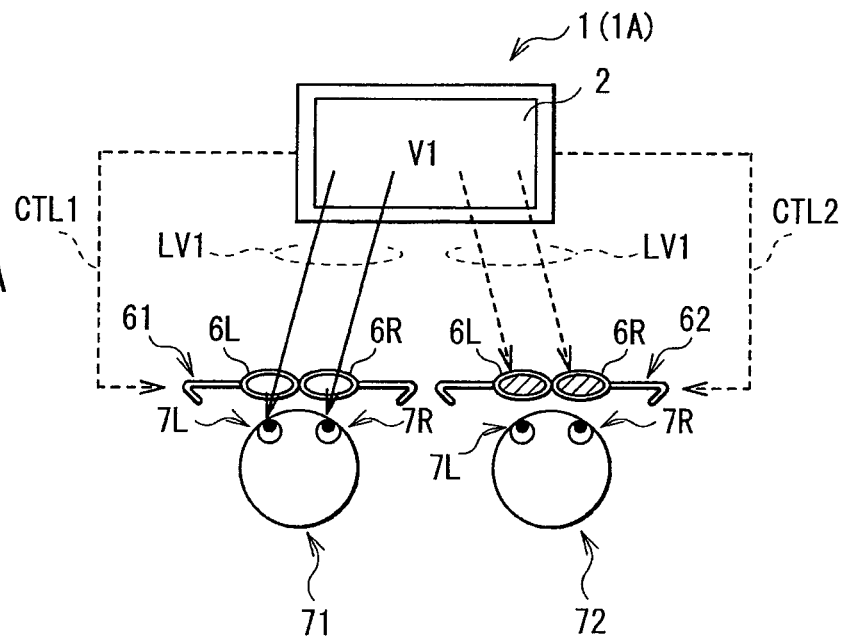
FIGS. 20A and 20B are schematic views illustrating a multiple picture display operation in a picture display system according to Modification 4.
Figure 20B:
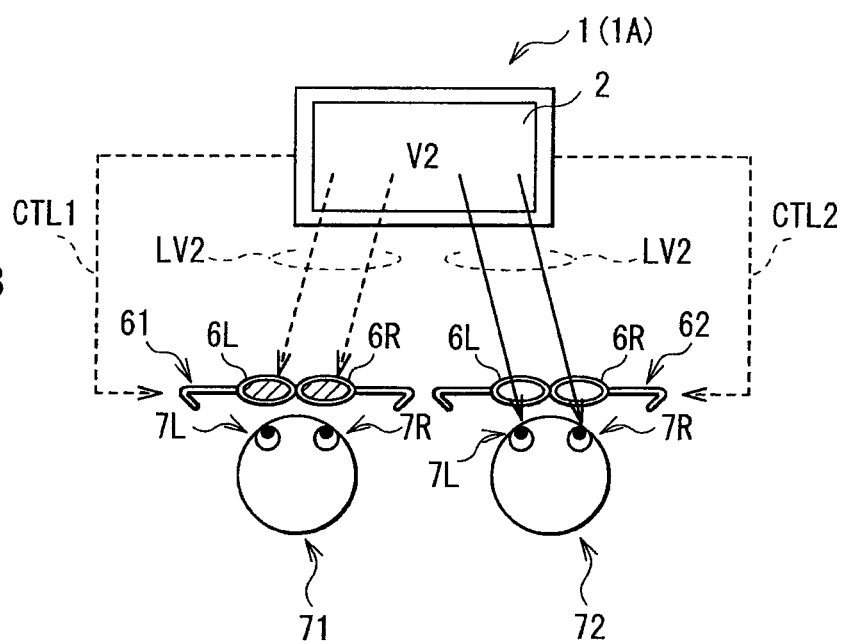

FIGS. 20A and 20B schematically illustrate a picture display operation in a picture display system (a multi-view system) according to Modification 4. In the modification, instead of the above-described stereoscopic picture display operation, a multiple picture display operation allowing a plurality of viewers (in this case, two viewers) to watch a plurality of (in this case, two) pictures, respectively, which are different from each other is performed.

In the multi-view system in the modification, a first picture based on a first picture signal corresponding to a first viewer and a second picture based on a second picture signal corresponding to a second viewer are displayed through performing time-divisional switching of a left-eye picture stream and a right-eye picture stream. In other words, in the embodiment, the left-eye pictures and the right-eye pictures are displayed for the left-eye lens 6L and the right-eye lens 6R in the shutter eyeglass device 6, respectively, but in the modification, a plurality of pictures corresponding to respective viewers (users) are displayed.

More specifically, as illustrated in FIG. 20A, in a displaying period of a first picture V1, in a shutter eyeglass device 61 used by a viewer 71, both of the right-eye lens 6R and the left-eye lens 6L are turned into an open state in response to a control signal CTL1. Moreover, in a shutter eyeglass device 62 used by a viewer 72, both of the right-eye lens 6R and the left-eye lens 6L are turned into a close state in response to a control signal CTL2. In other words, the shutter eyeglass device 61 used by the viewer 71 allows display light LV1 based on the first picture V1 to pass therethrough, and the shutter eyeglass device 62 used by the viewer 72 shields the display light LV1.

On the other hand, as illustrated in FIG. 20B, in a displaying period of a second picture V2, in the shutter eyeglass device 62 used by the viewer 72, both of the right-eye lens 6R and the left-eye lens 6L are turned into an open state in response to the control signal CTL2. Moreover, in the shutter eyeglass device 61 used by the viewer 71, both of the right-eye lens 6R and the left-eye lens 6L are turned into a close state in response to the control signal CTL1. In other words, the shutter eyeglass device 62 used by the viewer 72 allows display light LV2 based on the second picture V2 to pass therethrough, and the shutter eyeglass device 61 used by the viewer 71 shields the display light LV2.

Then, when such states are alternately repeated in a time-divisional manner, two viewers 71 and 72 are allowed to watch different pictures (the pictures V1 and V2), respectively (a multi-view mode is achieved).

Also, in the case where a multiple picture display operation is performed as in the case of the modification, when timing control described in the above-described embodiment and the like is performed in the timing control section 43, the same effects as those in the above-described embodiment and the like are obtainable.

Note that in the modification, the case where two viewers watch two different pictures, respectively is described; however, the disclosure is applicable to the case where three or more viewers watch three or more different pictures, respectively. Moreover, the number of pictures and the number of shutter eyeglass devices are not necessarily equal to each other. In other words, a plurality of shutter eyeglass devices performing an open/close operation corresponding to one picture may be prepared, and a plurality of viewers may watch the one picture.

Other Modifications

Although the present disclosure is described referring to the embodiment and the modifications, the disclosure is not limited thereto, and may be variously modified.

Figure 21:
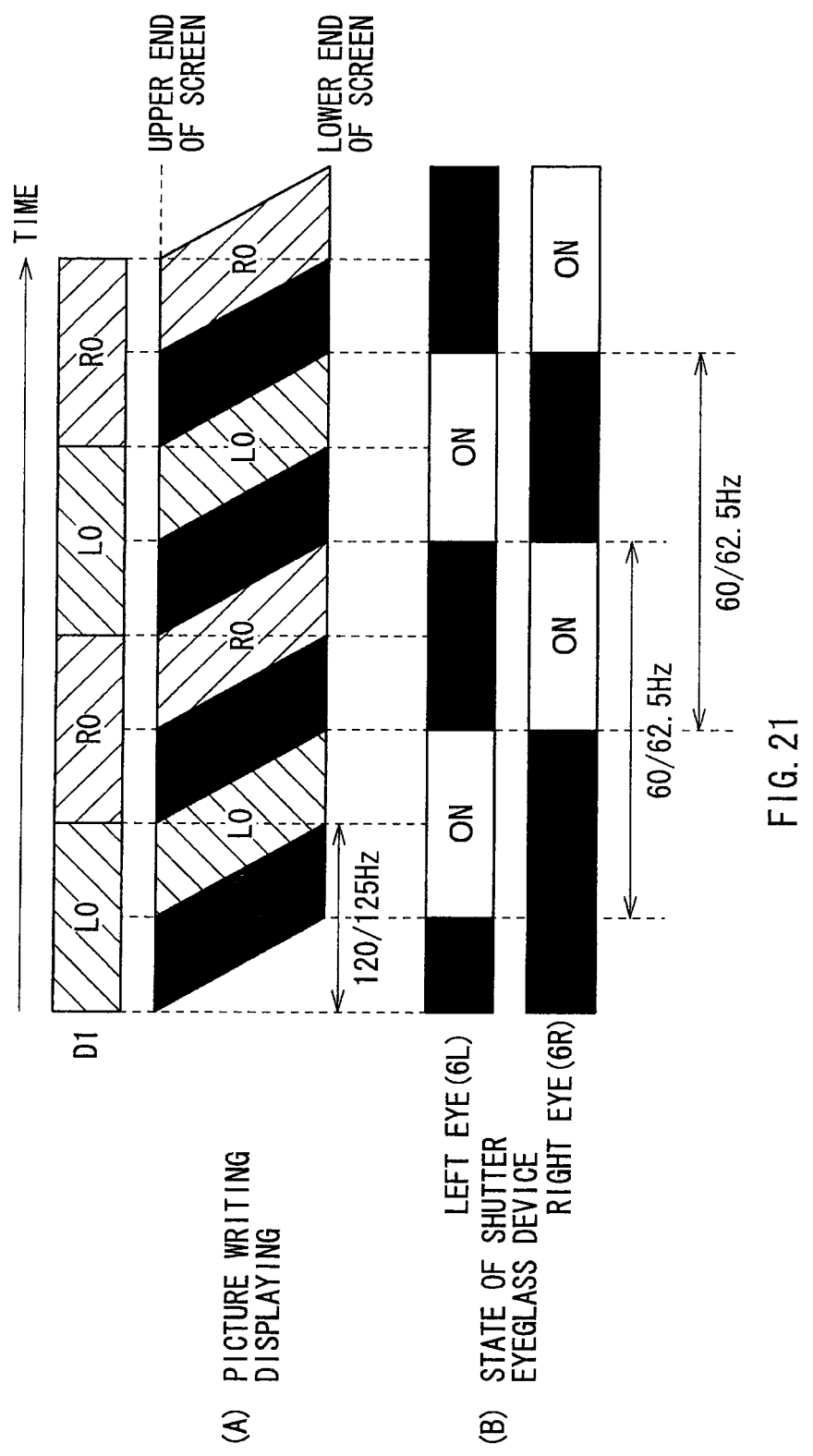

For example, in the above-described embodiment and the like, the case where the frame-rate-increasing conversion is performed by means of frame interpolation with use of the motion vector my is described; however, for example, as illustrated in parts (A) and (B) in FIG. 21, the original frame may be read two consecutive times to generate an interpolation frame. Even in the case where the frame-rate-increasing conversion is performed by generating the interpolation frame in such a manner, as long as the frame-rate-increasing conversion which increases the frame rate by more than twice is performed, the same effects as those in the above-described embodiments and the like are obtainable.

Moreover, in the above-described embodiment and the like, the case where the frame-rate-increasing conversion is performed on the input picture signal Din at 2-times, 4-times or 5-times speed is described; however, the disclosure is not limited thereto, and as long as the frame-rate-increasing conversion which increases the frame rate by more than twice is performed, conversion may be performed at any multiple speed.

Further, in Modification 3, the case where each of the frame-rate-converted picture streams (left-eye and right-eye picture streams) is supplied two consecutive times is described; however, the disclosure is not limited thereto, and, for example, each of the frame-rate-converted picture streams may be supplied three or more consecutive times.

In addition, in the above-described embodiment and the like, as an example of the picture display, the liquid crystal display including a liquid crystal display section including liquid crystal elements is described; however, the disclosure is applicable to picture displays of any other kinds. More specifically, the disclosure is applicable to a picture display using, for example, a PDP (Plasma Display Panel) or an organic EL (Electro-Luminescence) display.

In addition, the processes described in the above-described embodiment and the like may be performed by hardware or software. In the case where the processes are performed by software, a program forming the software is installed in a general-purpose computer or the like. Such a program may be stored in a recording medium mounted in the computer in advance.

The present application contains subject matter related to that disclosed in Japanese Priority Patent Application JP 2010-114653 filed in the Japan Patent Office on May 18, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A picture signal processor, comprising:
circuitry configured to:
perform a frame-rate-increasing conversion, which brings an over-double frame rate, on each of a plurality of time-series picture streams including right-eye picture streams and left-eye picture streams having a parallax therebetween, each of the right-eye picture streams and the left-eye picture streams including a plurality of unit pictures, through generating interpolation frames by frame interpolation of the plurality of unit pictures using a motion vector, by
performing a first motion vector detection process by block matching using a first luminance signal in a present frame of the plurality of unit pictures, a second luminance signal in a previous frame of the plurality of unit pictures, and a third luminance signal in a following frame of the plurality of unit pictures, wherein the motion vector of each of the present frame, previous frame, and following frame is stored in a non-transitory computer readable storage medium,
performing a second motion vector detection process on a next frame of the plurality of unit pictures using as a reference the motion vector of each of the present frame, previous frame, and following frame that is stored in the non-transitory computer readable storage medium, and
outputting, from the non-transitory computer readable storage medium, at the over-double frame rate, the interpolation frames and the motion vector;
provide frame-rate-converted picture streams to a display, the display being configured to display pictures through performing time-divisional switching of picture streams, including the right-eye picture streams and the left-eye picture streams, from one to another in order; and
control a shutter eyeglass device to perform an open/close operation in synchronization with a display switching timing between the frame-rate-converted picture streams of the right-eye picture streams and the left-eye picture streams in the display.

2. The picture signal processor according to claim 1, wherein the circuitry is configured to perform the frame-rate-increasing conversion to increase the frame rate of each of the picture streams by 2.5 times.

3. The picture signal processor according to claim 1, wherein the circuitry is configured to perform the frame-rate-increasing conversion so as to increase the frame rate of each of the picture streams by 4 times.

4. The picture signal processor according to claim 1, wherein the circuitry is configured to perform output control to allow unit pictures in each of the frame-rate-converted picture streams to be outputted a plurality of consecutive times for each, while allowing the frame-rate-converted picture streams to be time-divisionally switched from one to another in order.

5. The picture signal processor according to claim 1, wherein the circuitry is configured to control the shutter eyeglass device based on a control signal corresponding to the over-double frame rate of the frame-rate-converted picture streams.

6. The picture signal processor according to claim 1, wherein the circuitry is configured to perform the frame interpolation through inserting the generated interpolation frames between adjacent frames of original pictures at unequal intervals.

7. The picture signal processor according to claim 1, wherein the circuitry is configured to perform the frame interpolation though inserting the generated interpolation frames between adjacent frames of original unit pictures at equal intervals.

8. The picture signal processor according to claim 1, wherein the plurality of picture streams includes a left-eye picture stream and a right-eye picture stream having a parallax therebetween.

9. A picture display, comprising:
 circuitry configured to:
  perform a frame-rate-increasing conversion, which brings an over-double frame rate, on each of a plurality of time-series picture streams including right-eye picture streams and left-eye picture streams having a parallax therebetween, each of the right-eye picture streams and the left-eye picture streams including a plurality of unit pictures, through generating interpolation frames by frame interpolation of the plurality of unit pictures using a motion vector, by
  performing a first motion vector detection process by block matching using a first luminance signal in a present frame of the plurality of unit pictures, a second luminance signal in a previous frame of the plurality of unit pictures, and a third luminance signal in a following frame of the plurality of unit pictures, wherein the motion vector of each of the present frame, previous frame, and following frame is stored in a non-transitory computer readable storage medium,
  performing a second motion vector detection process on a next frame of the plurality of unit pictures using as a reference the motion vector of each of the present frame, previous frame, and following frame that is stored in the non-transitory computer readable storage medium, and
  outputting, from the non-transitory computer readable storage medium, at the over-double frame rate, the interpolation frames and the motion vector;
 display pictures with use of the plurality of unit pictures in frame-rate-converted picture streams through performing time-divisional switching of picture streams, including the right-eye picture streams and the left-eye picture streams, from one to another in order; and
 control a shutter eyeglass device to perform an open/close operation in synchronization with a display switching timing between the frame-rate-converted picture streams of the right-eye picture streams and the left-eye picture streams.

10. The picture display according to claim 9, wherein the picture display is a liquid crystal display panel including liquid crystal elements.

11. A picture display system, comprising:
 a picture display, configured to display pictures through performing time-divisional switching of a plurality of time-series picture streams from one to another in order, the plurality of time-series picture streams including right-eye picture streams and left-eye picture streams having a parallax therebetween, each of the right-eye picture streams and the left-eye picture streams including a plurality of unit pictures; and
 a shutter eyeglass device, configured to perform an open/close operation in synchronization with a display switching timing between picture streams of the right-eye picture streams and the left-eye picture streams in the picture display,
 wherein the picture display system includes circuitry configured to:
  perform a frame-rate-increasing conversion, which brings an over-double frame rate, on each of the plurality of time-series picture streams, through generating interpolation frames by frame interpolation of the plurality of unit pictures using a motion vector, by
  performing a first motion vector detection process by block matching using a first luminance signal in a present frame of the plurality of unit pictures, a second luminance signal in a previous frame of the plurality of unit pictures, and a third luminance signal in a following frame of the plurality of unit pictures, wherein the motion vector of each of the present frame, previous frame, and following frame is stored in a non-transitory computer readable storage medium,
  performing a second motion vector detection process on a next frame of the plurality of unit pictures using as a reference the motion vector of each of the present frame, previous frame, and following frame that is stored in the non-transitory computer readable storage medium, and
  outputting, from the non-transitory computer readable storage medium, at the over-double frame rate, the interpolation frames and the motion vector,
  display pictures with use of the plurality of unit pictures in frame-rate-converted picture streams of the right-eye picture streams and the left-eye picture streams, and
  control the shutter eyeglass device to perform the open/close operation.

12. The picture display according to claim 9, wherein the circuitry is configured to control the shutter eyeglass device based on a control signal corresponding to the over-double frame rate of the frame-rate-converted picture streams.

13. The picture display system according to claim 11, wherein the circuitry is configured to control the shutter eyeglass device based on a control signal corresponding to the over-double frame rate of the frame-rate-converted picture streams.

* * * * *